United States Patent [19]
Müller et al.

[11] Patent Number: 5,917,501
[45] Date of Patent: Jun. 29, 1999

[54] METHOD OF CUTTING OUTLINE FONTS INTO STROKES AND PARTS

[75] Inventors: Walter Müller; Frank Jung; Annette Bickel, all of München, Germany

[73] Assignee: Fujitsu Limited, Kawasaki, Japan

[21] Appl. No.: 08/684,894

[22] Filed: Jul. 25, 1996

[30] Foreign Application Priority Data

Nov. 9, 1995 [JP] Japan ................................. 7-290701

[51] Int. Cl.$^6$ .................................................. G06F 15/00
[52] U.S. Cl. ............................................................ 345/467
[58] Field of Search .................................... 345/469, 471, 345/467, 468, 470, 472, 117, 118, 721

[56] References Cited

U.S. PATENT DOCUMENTS 5,257,351  10/1993  Leonard et al. ......................... 395/150
5,526,476  6/1996   Motokako et al. ...................... 395/151

*Primary Examiner*—Phu K. Nguyen
*Attorney, Agent, or Firm*—Staas & Halsey

[57] ABSTRACT

In an outline-font creating apparatus for expressing a character by a collection of parts, learning is performed by storing the shapes of strokes, which have been cut from a character by operator operation, in a stroke template storage unit. Strokes in characters are cut from characters automatically based upon the stroke templates that have been learned, and the shapes of these cut strokes are stored in memory. If there are characters that cannot be cut into strokes automatically by the system, the shapes of strokes that have been cut from some of these characters by the operator are stored in the stroke template storage unit. On the basis of the stroke template shapes that have been learned again, strokes are cut automatically from any characters remaining uncut and these strokes are cut into parts and are stored in the stroke template storage unit.

12 Claims, 43 Drawing Sheets

FIG.2
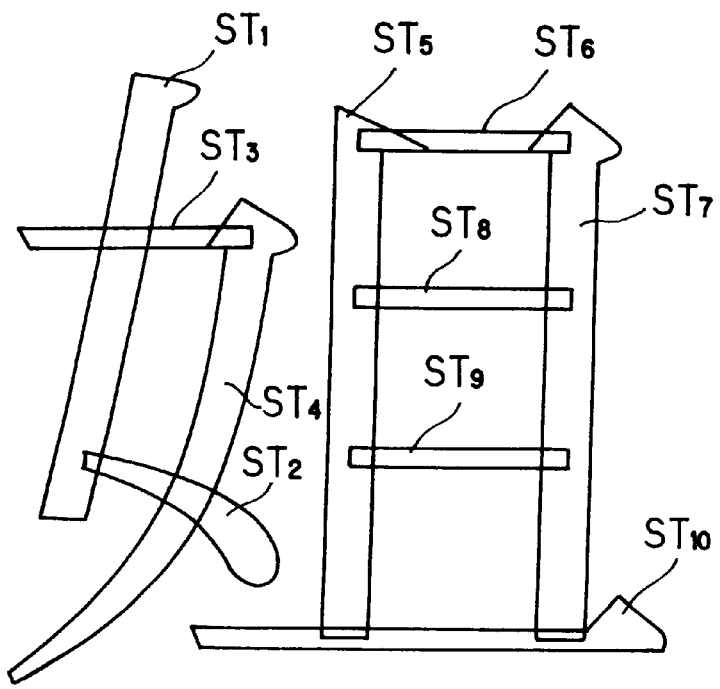
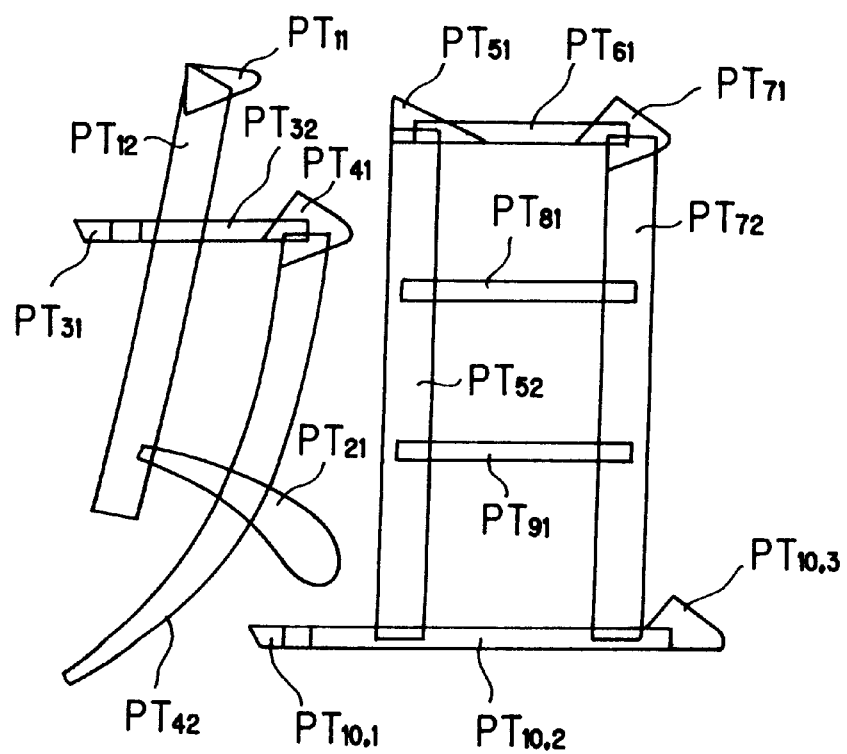

Ins Vix/0

U

Arrow

Cross

| STROKE ARCHETYPE | SHAPE DATA (DIRECTION + OVERLAP) |
|---|---|
|  |  |
|  |  |
|  |  | direction codes :

| ARCHETYPE 4001 (STROKE CODE 4 = HORIZONTAL STROKE, CLASSIFICATION 1) ||||
|---|---|---|---|
| TEMPLATE POINT | RIGHT-DIRECTION CODE | LEFT-DIRECTION CODE | OVERLAP ? (YES/NO) |
| 1 | NW | SW | NO |
| 2 | SW | W | NO |
| 3 | W | SE | NO |
| 4 | SE | E | NO |
| 5 | E | N | NO |
| 6 | N | NW | NO |

| ARCHETYPE 4002 (STROKE CODE 4 = HORIZONTAL STROKE, CLASSIFICATION 2) ||||
|---|---|---|---|
| TEMPLATE POINT | RIGHT-DIRECTION CODE | LEFT-DIRECTION CODE | OVERLAP ? (YES/NO) |
| 1 | N | W | INSIDE OVERLAP |
| 2 | W | SE | NO |
| 3 | SE | E | NO |
| 4 | E | N | INSIDE OVERLAP |

| ARCHETYPE 9004 (STROKE CODE 9 = VERTICAL SLANTING, CLASSIFICATION 4) | | | |
|---|---|---|---|
| TEMPLATE POINT | RIGHT-DIRECTION CODE | LEFT-DIRECTION CODE | OVERLAP ? (YES/NO) |
| 1 | NE | W | INSIDE OVERLAP |
| 2 | W | SW | INSIDE OVERLAP |
| 3 | SW | E | INSIDE OVERLAP |
| 4 | E | NE | INSIDE OVERLAP |

| ARCHETYPE 9007 (STROKE CODE 9 = VERTICAL SLANTING, CLASSIFICATION 7) | | | |
|---|---|---|---|
| TEMPLATE POINT | RIGHT-DIRECTION CODE | LEFT-DIRECTION CODE | OVERLAP? (YES/NO) |
| 1 | NW | SW | NO |
| 2 | SW | E | ON-LINE OVERLAP |
| 3 | E | S | CORNER OVERLAP |
| 4 | S | E | INSIDE OVERLAP |
| 5 | E | N | INSIDE OVERLAP |
| 6 | N | E | NO |
| 7 | E | NW | NO |

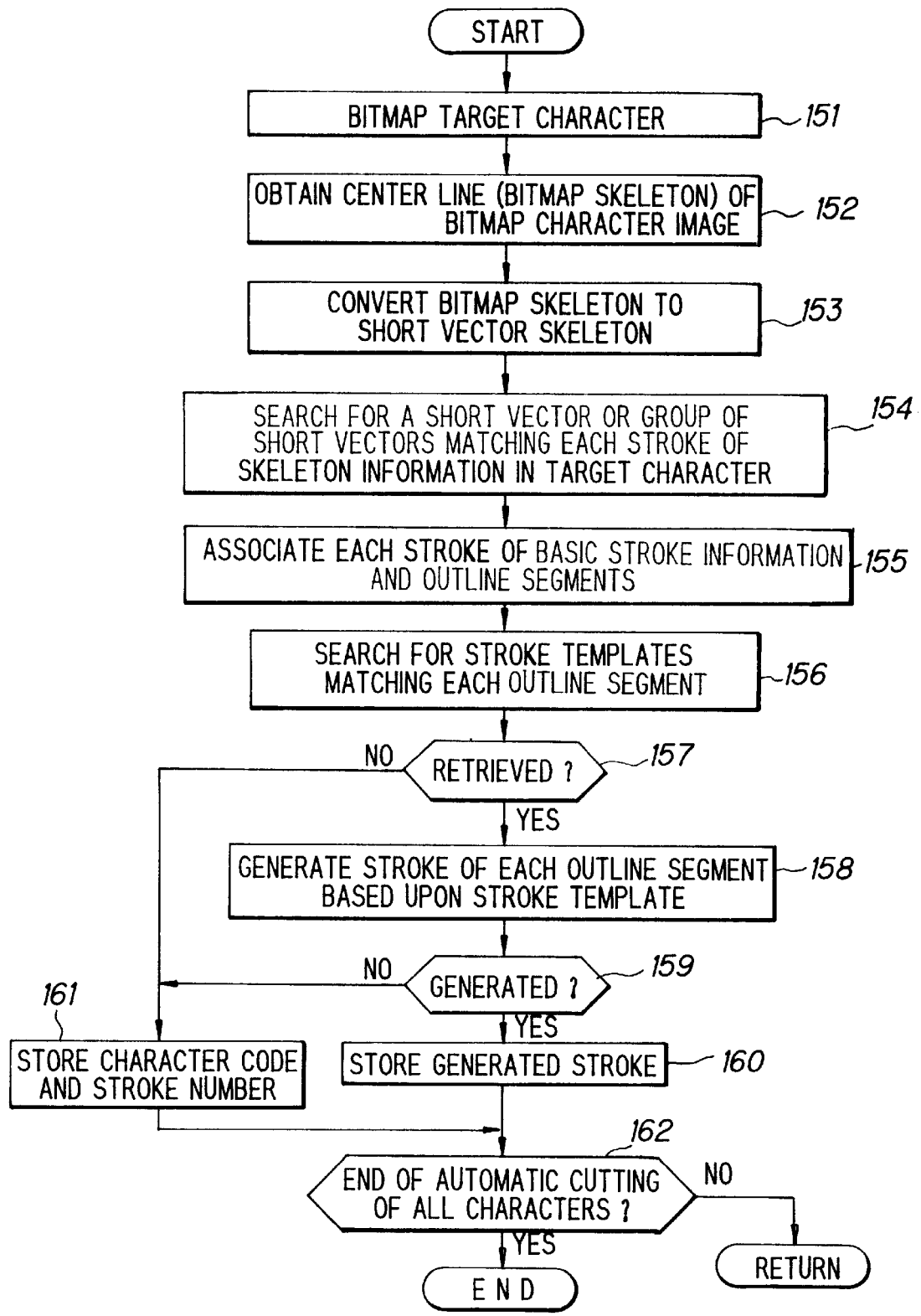

CONSTITUTION OF FIRST STROKE BASED UPON ARCHETYPE 4002

| GAP | NUMBER OF POINTS OF UNKNOWN TEMPLATE | POINT TYPE | OVERLAP | CUT OPERATOR APPLIED |
|---|---|---|---|---|
| G1 | NONE | NONE | NONE | Smooth |
| G2 | 2 | BOTH CORNERS | INSIDE OVERLAP | U |

FIG. 26A
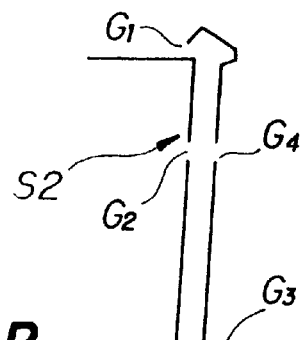
FIG. 26B
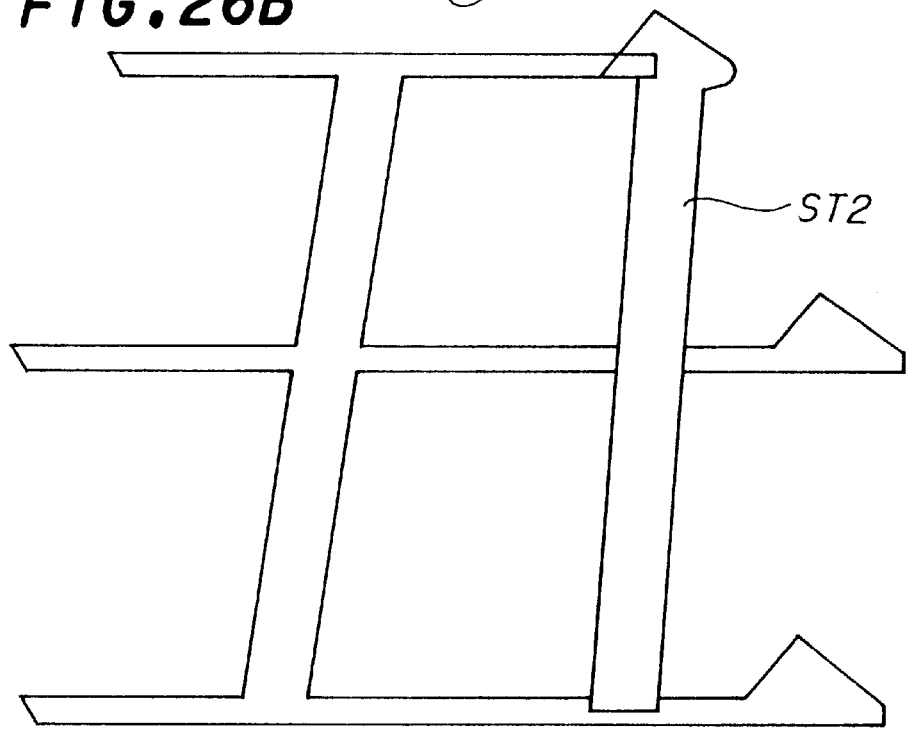
FIG. 26C
CONSTITUTION OF SECOND STROKE BASED UPON ARCHETYPE 9007
| GAP | NUMBER OF POINTS OF UNKNOWN TEMPLATE | POINT TYPE | OVERLAP | CUT OPERATOR APPLIED |
|---|---|---|---|---|
| G1 | 1 | CORNER | ON-LINE OVERLAP | Ext For |
| G2,4 | NONE | NONE | NONE | Smooth |
| G3 | 2 | BOTH CORNERS | INSIDE OVERLAP | U |

FIG. 27A
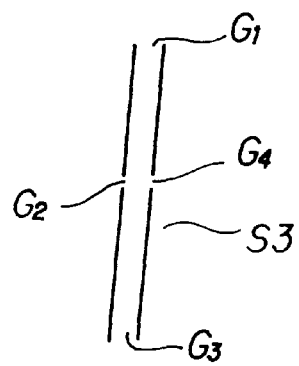
FIG. 27B
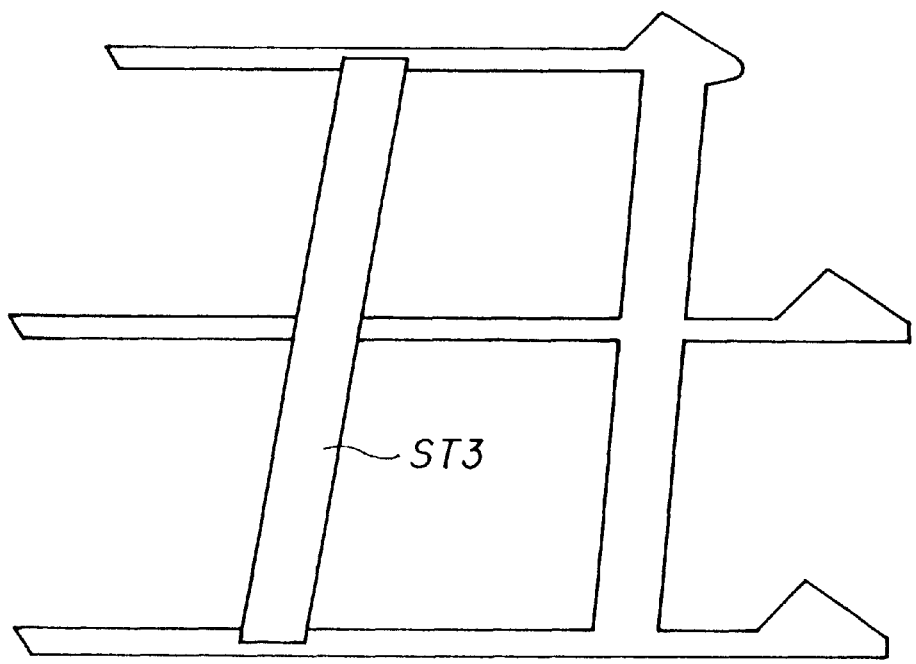
FIG. 27C
CONSTITUTION OF THIRD STROKE BASED UPON ARCHETYPE 9004
| GAP | NUMBER OF POINTS OF UNKNOWN TEMPLATE | POINT TYPE | OVERLAP | CUT OPERATOR APPLIED |
|---|---|---|---|---|
| G2, 4 | NONE | NONE | NONE | Smooth |
| G1, 3 | 2 | BOTH CORNERS | INSIDE OVERLAP | U |

FIG. 28A
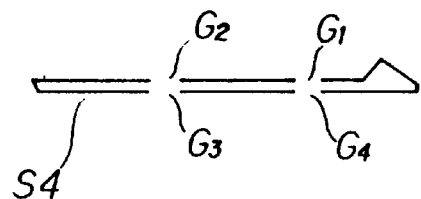
FIG. 28B
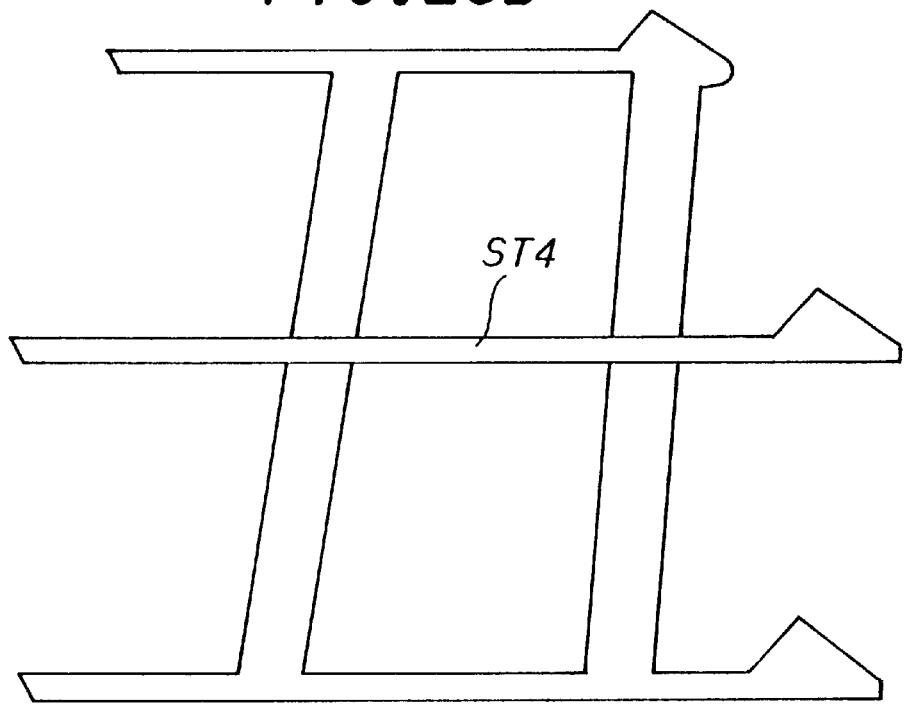
FIG. 28C
CONSTITUTION OF FOURTH STROKE BASED UPON ARCHETYPE 4001
| GAP | NUMBER OF POINTS OF UNKNOWN TEMPLATE | POINT TYPE | OVERLAP | CUT OPERATOR APPLIED |
|---|---|---|---|---|
| G1,2,3,4 | NONE | NONE | NONE | Smooth |

FIG. 29A
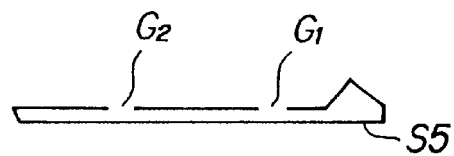
FIG. 29B
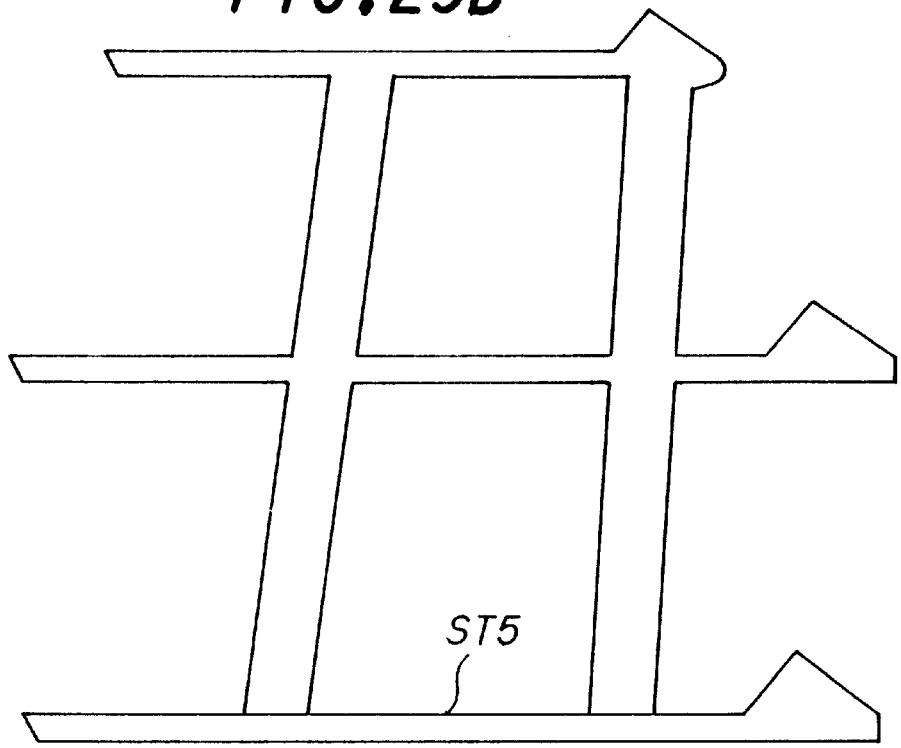
FIG. 29C
CONSTITUTION OF FIFTH STROKE BASED UPON ARCHETYPE 4001
| GAP | NUMBER OF POINTS OF UNKNOWN TEMPLATE | POINT TYPE | OVERLAP | CUT OPERATOR APPLIED |
|---|---|---|---|---|
| G1, 2 | NONE | NONE | NONE | Smooth |

FIG. 30
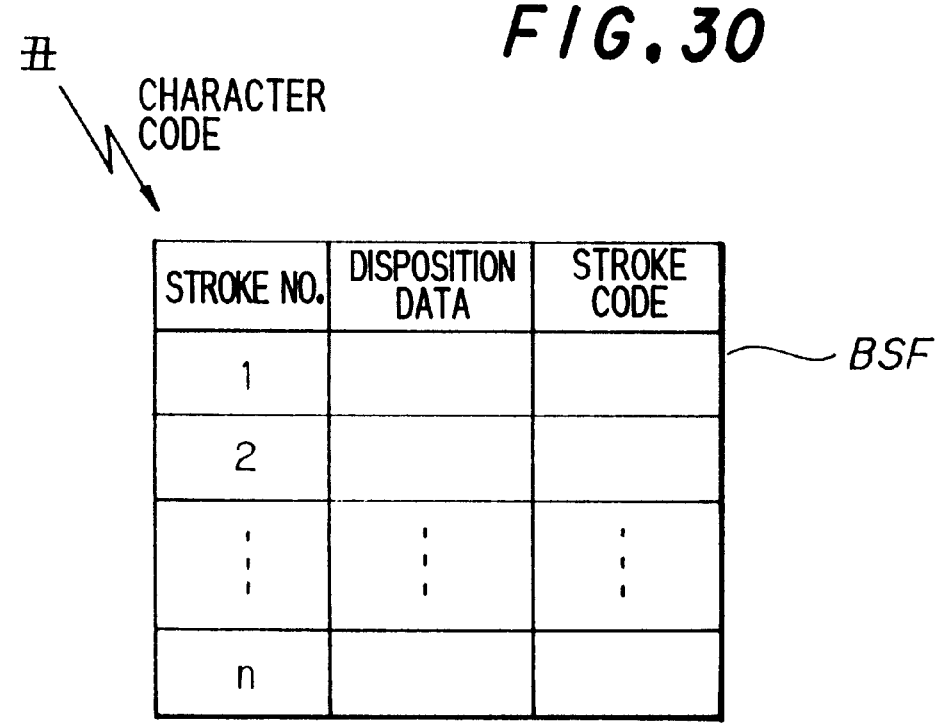
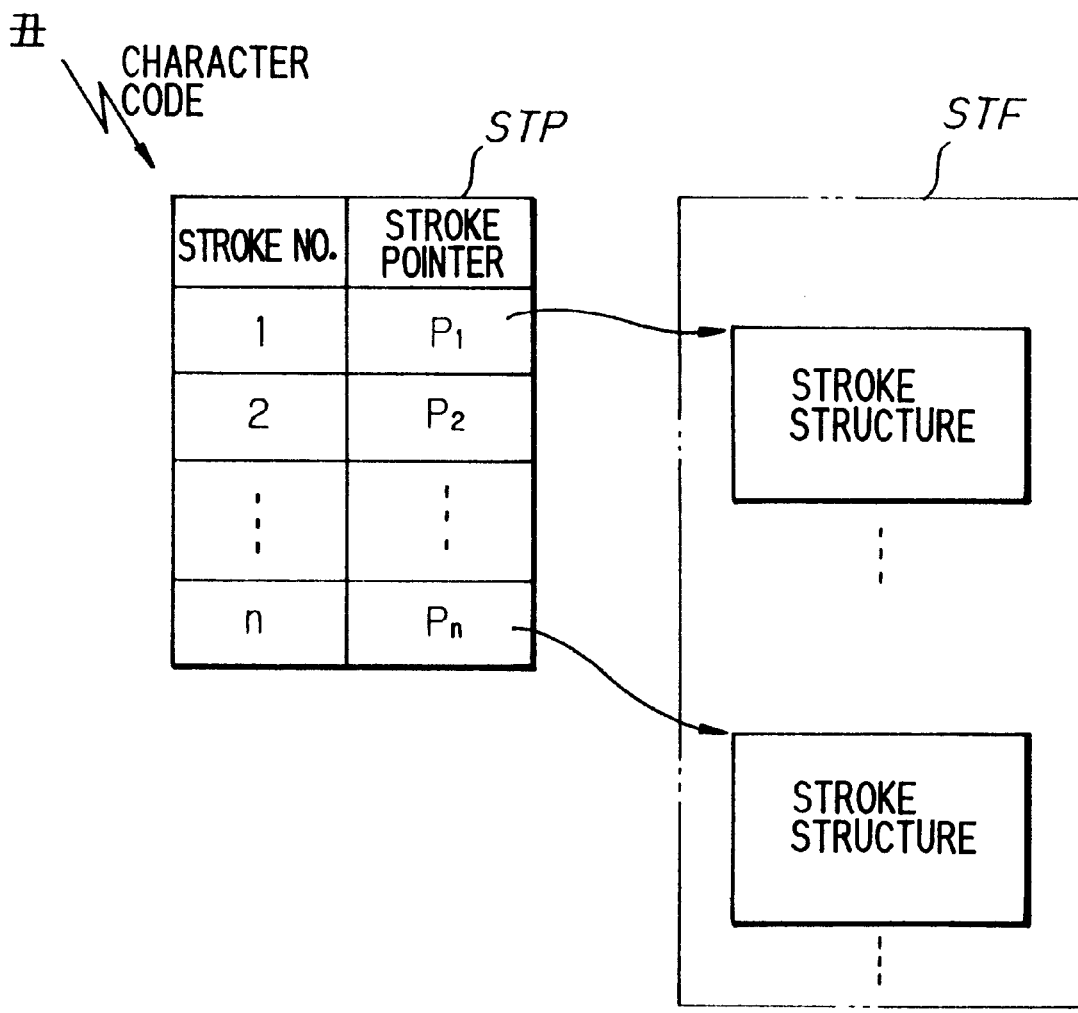

FIG. 32A

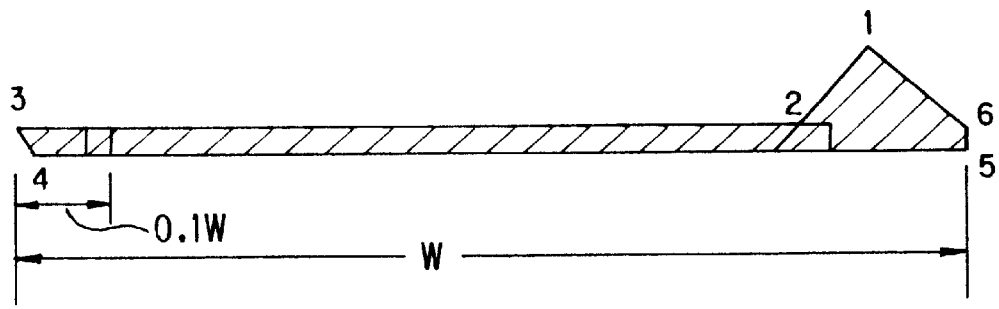

FIG. 32B

| STROKE PROTOTYPE OF ARCHETYPE 4001 | ( STROKE CODE = 4. HORIZONTAL ) ( STROKE VARIATION = 1 ) | | |
|---|---|---|---|
| TOPOLOGICAL DATA | TEMPLATE POINT | LEFT-DIRECTION CODE | OVERLAP ? (YES/NO) |
| | 1 | SW | NO |
| | 2 | W | NO |
| | 3 | SE | NO |
| | 4 | E | NO |
| | 5 | N | NO |
| | 6 | NW | NO |
| CUTTING FUNCTION | APPLY CUT OPERATOR "Vertical" AT POINT THAT IS 0.1 W FROM TEMPLATE POINT 3 | | |
| | APPLY CUT OPERATOR "Ext For" AT TEMPLATE POINT 2 | | |
| PART-TYPE CODE INFORMATION | NUMBER OF STARTING PARTS | | 1 |
| | NUMBER OF MIDDLE PARTS | | 1 |
| | NUMBER OF END PARTS | | 1 |

| STROKE PROTOTYPE OF ARCHETYPE 22001 | (STROKE CODE = 22, LEFT DIRECTION CURVE OBLIQUE LINE VARIATION = 001) | | |
|---|---|---|---|
| TOPOLOGICAL DATA | TEMPLATE POINT | LEFT-DIRECTION CODE | OVERLAP ? (YES/NO) |
| | 1 | SW | NO |
| | 2 | SE | NO |
| | 3 | NE | NO |
| | 4 | E | NO |
| | 5 | NW | NO |
| | | | |
| CUTTING FUNCTION | APPLY CUT OPERATOR "Ins Vtx" AT TEMPLATE POINTS 1, 4 | | |
| PART-TYPE CODE INFORMATION | NUMBER OF STARTING PARTS | | 1 |
| | NUMBER OF MIDDLE PARTS | | 1 |
| | NUMBER OF END PARTS | | 0 |

FIG. 34A

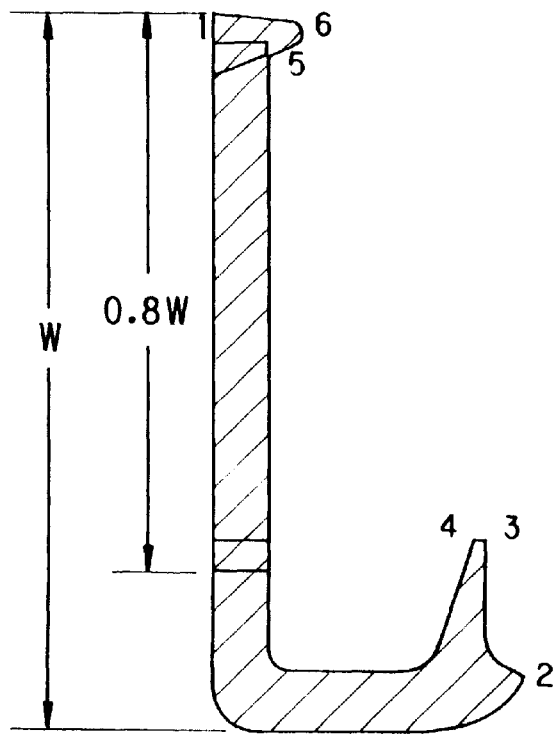

FIG. 34B

| STROKE PROTOTYPE OF ARCHETYPE 24001 | (STROKE CODE = 24, VERTICAL & HORIZONTAL STROKES VARIATION = 001) | | |
|---|---|---|---|
| TOPOLOGICAL DATA | TEMPLATE POINT | LEFT-DIRECTION CODE | OVERLAP ? (YES/NO) |
| | 1 | S | NO |
| | 2 | NW | NO |
| | 3 | W | NO |
| | 4 | S | NO |
| | 5 | E | NO |
| | 6 | W | NO |
| CUTTING FUNCTION | APPLY CUT OPERATOR "Ext Back/U" AT TEMPLATE POINT 5 APPLY CUT OPERATOR "Horiz" AT POINT THAT IS 0.8 W FROM TEMPLATE POINT 1 | | |
| PART-TYPE CODE INFORMATION | NUMBER OF STARTING PARTS | | 1 |
| | NUMBER OF MIDDLE PARTS | | 1 |
| | NUMBER OF END PARTS | | 1 |

METHOD OF CUTTING OUTLINE FONTS INTO STROKES AND PARTS

BACKGROUND OF THE INVENTION

This invention relates to a method of cutting outline fonts into strokes and parts. More particularly, the invention relates to a method of cutting a character into strokes and cutting the strokes into parts efficiently in an outline font technique of the type which cuts the outline of a character into parts, defines the contour of each part, expresses the character by the collection of the parts and, in outputting the character, develops the contours of the parts forming the character into a bitmap image and outputs the same.

The Japanese language, which employs three different character sets referred to as kanji, hiragana and katakana (these characters shall be referred to collectively as "Japanese characters") differs greatly from the European languages that employ one character set, namely the Roman alphabet. In general, hiragana and katakana (referred to collectively as kana) are designed to be somewhat smaller than kanji and it is possible to combine separately designed kanji and separately designed kana.

A Japanese character is formed inside a design frame referred to as a "body". Unlike the Roman alphabet, in which characters can have different widths from one character to the next, the widths of Japanese characters do not change from character to character. Further, whereas the longitudinal line in the alphabetic character "P", for example, is designed to be vertical, the two longitudinal lines in the kanji 門 are designed to converge slightly at their lower ends in certain styles of type. The reason for this design is to compensate for the illusion of a "top heaviness", which gives the character an unstable appearance. Such compensation for optical illusions is a characteristic of kanji.

Furthermore, since some kanji are composed of many vertical and/or horizontal lines, achieving balance among these lines is important. The blank space between two lines is referred to as "white space". Reproducing a white space to have the same balance as that possessed by the original design is one requirement in achieving a character having high quality.

When a kanji character having these features is expressed by a collection of very small dots, it is difficult to achieve a fine representation smaller than the size of the individual dots. When the number of dots is small, not only is it impossible to represent slender portions of the original design but there are even instances where all horizontal or vertical lines in the character cannot be properly spaced apart, thus producing a deteriorated, indistinct character whose lines run together. In a situation where the number of dots is too small to express a character design, the only function left for the character is merely the transmission and/or recording of information. In such cases, therefore, the chief aim is to prevent character deterioration, rather than to provide attractive design, in order to improve legibility. The question of design, i.e., as to which style of type is being used, is no longer important.

In the case of a bitmap font in which an optimum character pattern is formed by the human hand, a technique employed to prevent character deterioration and maintain legibility is to change the balance of the overall character or thin out some of the vertical or horizontal lines. In the case of a character composed of 16×16 dots used to present a display on the screen of a personal computer or word processor, the above-mentioned technique usually is employed. Since the lines thinned out are selected with great care, there are instance where they cannot be noticed at a glance.

However, when a plurality of sizes are required, character patterns conforming to the various sizes must be prepared for bitmap fonts, thus necessitating a memory having a large storage capacity. In order to reproduce characters of various sizes using a small quantity of data without sacrificing the style of the printing type, there has been a shift in favor from bitmap fonts to outline fonts. As shown in FIG. 37, an outline font is one in which the contour of the character is expressed by coordinates in a 1000×1000 XY coordinate system. The contour data are outputted upon being bit-mapped by a character generating program. With such outline fonts, multiple-point designation (the designation of different printing sizes) is possible. Character quality can be maintained without compromising the style of the printing type regardless of how large the character is made.

Unfortunately, however, outline font techniques presently available have a disadvantage. Specifically, the smaller the point size of a character is made, the greater the decline in character quality produced and the more unattractive the form of the character is made to appear to the naked eye. This is due to rounding error, which arises when the contour of a character expressed in a 1000×1000 XY coordinate system is expressed in a physical coordinate system of m×m dots (e.g., 16×16 dots). FIGS. 38A, 38B are examples of sample of characters outputted using conventional outline fonts and bitmap fonts. FIG. 38A illustrates a sample based upon conventional outline fonts, and FIG. 38B shows an example based upon bitmap fonts. The characters in the upper row of each Figure are composed of 24×24 dots, the characters at the left of each lower row are composed of 18×18 dots, and the characters at the right of each lower row are composed of 14×14 dots. If the number of dots is large, a difference in quality between outline fonts and bitmap fonts is not noticeable. When character size is made small, however, the difference between these fonts manifests itself clearly. Specifically, with the outline fonts of 18×18 dots, the sizes of the characters are not uniform (the kanji 視 is larger than the other characters). With the outline fonts of 14×14 dots, portions of some characters are made indistinct by deterioration. In the case of the bitmap fonts, the fonts are formed by thinning out portions of the vertical or horizontal lines to prevent deterioration and maintain legibility and to change the overall balance when the number of dots is small. As a result, character deterioration and a variance in character size can be prevented. FIG. 38C illustrates character samples based upon fonts composed of parts in accordance with the present invention, described later.

Thus, with the conventional outline font techniques, fine processing cannot be executed, as is possible with bitmap fonts. When character size is reduced, a variance in size occurs and the characters deteriorate. The reason for this is the occurrence of rounding error, as mentioned above, and the fact that "camouflage" utilizing visual characteristics cannot be applied. Furthermore, with processing using the conventional outline fonts, there are instances where slender character portions that appear needless to the human eye are reproduced upon being emphasized. This occurs because it is not possible to determine which portions of a character are important for the purpose of improving legibility.

In summary, therefore, bitmap fonts created by the human hand have a high quality but require a large memory capacity and do not satisfy the needs of the DTP (desktop publishing) age. On the other hand, the conventional outline fonts are suitable for DTP. However, since the character images are generated by processing, there is a decline in quality where small characters are concerned.

Accordingly, there is a need to be able to generate character images having a high quality equivalent to that of bitmap fonts but by using outline fonts.

A kanji character is by nature a collection of a plurality of vertical and/or horizontal lines. With the conventional outline font technique, however, all of the vertical and horizontal lines are lumped together to express contour lines, as a result of which the above-described problems arise. Accordingly, as illustrated in FIG. 39, contours are partitioned into single strokes [strokes STi (i=1, 2, ...)] such as vertical lines, horizontal lines, oblique lines, right sweeps and left sweeps, the contours are expressed per each stroke STi, the character is captured as a collection of these strokes, the contour data of each stroke are bitmapped by a character generating program and the bitmap is outputted. If this expedient is adopted, the relationship between vertical lines or horizontal lines, etc., is clarified. Moreover, which portions of a character are important and which are unnecessary for the purpose of improving legibility can be ascertained to make various types of control possible.

It is possible to build upon this concept. Specifically, in case of a small character size, recognition of the form of the character is more important than a difference in the style of type. Therefore, if information (basic stroke information) representing the form of the character and information (contour information) representing the style of type can be separated, high-quality characters can be generated from small-size characters, in which legibility is important, to large-size characters, in which reproduction of the distinctive quality of the style of type is important. The basic stroke information mentioned here is information about the basic structure of the character form and is not information regarding central lines that flesh out a character.

The inventors have considered the foregoing points and have developed and provided an outline font technique which includes (1) separating each character into strokes using basic stroke (skeleton) information, (2) dividing the strokes into parts, (3) defining the contour of each part and expressing the character as a collection of the parts, and (4), in outputting the character, developing the contours of the parts constructing the character into a bitmap image and outputting the bitmap image of the character.

FIG. 40 is a diagram for describing a character, strokes and parts. This illustrates a case where the kanji character 舞 is separated into strokes (a character-to-stroke cut) and the strokes are divided into parts (a stroke-to-part cut). The collection of the parts forms the contour information. In FIG. 40, the "elements" are illustrated to expedite the explanation and are not units used in actual processing. The kanji character 舞 is separated into a number of strokes, each stroke is cut into parts (a starting part, a middle part and an end part) appropriately, and the parts form the contour information.

FIG. 41 is a diagram for describing basic stroke information. A stroke number is assigned to each stroke in accordance with the order in which a character is written, and stroke disposition data (starting point and end point) of the strokes and stroke codes indicating the types of strokes are assigned in the order of the stroke numbers to construct the information. FIG. 41 illustrates the basic stroke information of the kanji character 七.

As shown in FIGS. 42A and 42B, the contour shape of each part is expressed by arraying, in the counter-clockwise direction, the coordinate values (in the part coordinate system) of the points P1~P6, Q1~Q4 of the part outlines. FIG. 42A illustrates the shape of the starting part of the kanji character ──●, and FIG. 42B illustrates the shape of the end part of the kanji character ──●.

FIG. 43 is a diagram for describing the structure of a font file in which a character is expressed by a collection of parts. The file includes a header field 1a for storing various font-related information such as the font name and the date of its creation, and a character pointer field 1b which stores a character pointer for pointing to a parts pointer string conforming to the character code. A part pointer field 2 stores (1) disposition data of all parts constructing the character, and (2) pointers to part contour data. A contour data field 3 stores part contour data of all parts. The part disposition data in the part pointer field 2 indicate where in the outline font coordinate system (a coordinate system of 1000×1000 dots) a part is disposed. Specifically, the part disposition data indicate the positional coordinates of the part origin (see FIGS. 42A, 42B) in the character coordinate system. As shown in FIGS. 44A and 44B, the disposition data illustrated in FIG. 43 is for a case where the part origin of the starting part of the lowermost horizontal stroke (horizontal line) in the kanji character is given by (56,493), the part origin of the middle part is given by (111,493) and the part origin of the end part is given by (953,493).

In this outline font technology for cutting the outline of a character into parts, defining the contour of each part, expressing the character by the collection of the parts and, in outputting the character, developing the contours of the parts constructing the character into bitmap images and then outputting the images of the character, it is required that a character is cut into strokes and the strokes into parts efficiently.

In conventional practice, however, the operator cuts the character into strokes and cuts the strokes into parts manually one character at a time. This requires an enormous amount of labor.

Further, with the system in which the above operation is performed manually, there are no tools for cutting a character into strokes and cutting strokes into tools in a manner which provides high quality. Accordingly, the original outline font cannot be cut accurately while maintaining the design possessed by the original outline font.

SUMMARY OF THE INVENTION

Accordingly, an object of the present invention is to provide a method of cutting an outline font into strokes and cutting the strokes into parts, wherein a character can be cut into strokes and the strokes into parts in a highly efficient manner.

Another object of the present invention is to provide a method of cutting an outline font into strokes and cutting the strokes into parts accurately while maintaining the design possessed by the original outline font.

According to the present invention, the foregoing objects are attained by providing a method of cutting an outline font into strokes in an outline-font creation apparatus for cutting an outline of a character into single strokes, cutting the strokes into parts and expressing the character by a collection of the parts, the method comprising a first step of learning the shapes of strokes, which have been cut from characters by operator operation, as the shapes of stroke templates; a second step of cutting each character into strokes automatically based upon the learned shapes of the stroke templates; if characters which cannot be cut into strokes automatically exist, a third step of re-learning the shapes of strokes, which have been cut from several of these characters by operator operation, as the shapes of stroke templates; and a fourth step of cutting strokes automatically from as yet uncut characters based upon the re-learned shapes of the stroke templates.

Further, according to the present invention, the foregoing objects are attained by providing a method of cutting an outline font into parts in an outline-font creation apparatus for cutting an outline of a character into single strokes, cutting the strokes into parts and expressing the character by a collection of the parts, the method comprising a first step of learning, by storing as stroke prototype information, a cutting method, cutting positions and stroke shapes that prevail when strokes are cut into parts by operator operation; a second step of cutting each stroke into parts automatically based upon the learned stroke prototype information; if strokes that cannot be cut automatically exist, a third step of cutting several of these strokes into parts by operator operation and re-learning, by storing as stroke prototype information, a cutting method, cutting positions and stroke shapes that prevail when these several strokes are cut into parts; and a fourth step of automatically cutting strokes, which have not yet been cut, based upon the re-learned stroke prototype information.

Other features and advantages of the present invention will be apparent from the following description taken in conjunction with the accompanying drawings.

BRIEF DESCRIPTION OF THE DRAWINGS

FIG. 2 is a diagram for describing the strokes and parts of a character;

FIG. 23 shows the flow of automatic cutting processing;

FIGS. 26A, 26B, 26C are diagrams (part 3) for describing automatic cutting;

FIGS. 27A, 27B, 27C are diagrams (part 4) for describing automatic cutting;

FIGS. 28A, 28B, 28C are diagrams (part 5) for describing automatic cutting;

FIGS. 29A, 29B, 29C are diagrams (part 6) for describing automatic cutting;

FIG. 30 is a diagram for describing the relationship between a character code and a stroke file;

FIGS. 32A, 32B are diagrams (part 1) for describing stroke prototypes;

FIGS. 34A, 34B are diagrams (part 3) for describing stroke prototypes;

FIGS. 38A, 38B, 38C are samples of outputted characters;

DESCRIPTION OF THE PREFERRED EMBODIMENT

(A) OVERVIEW OF THE INVENTION

Figure 1:
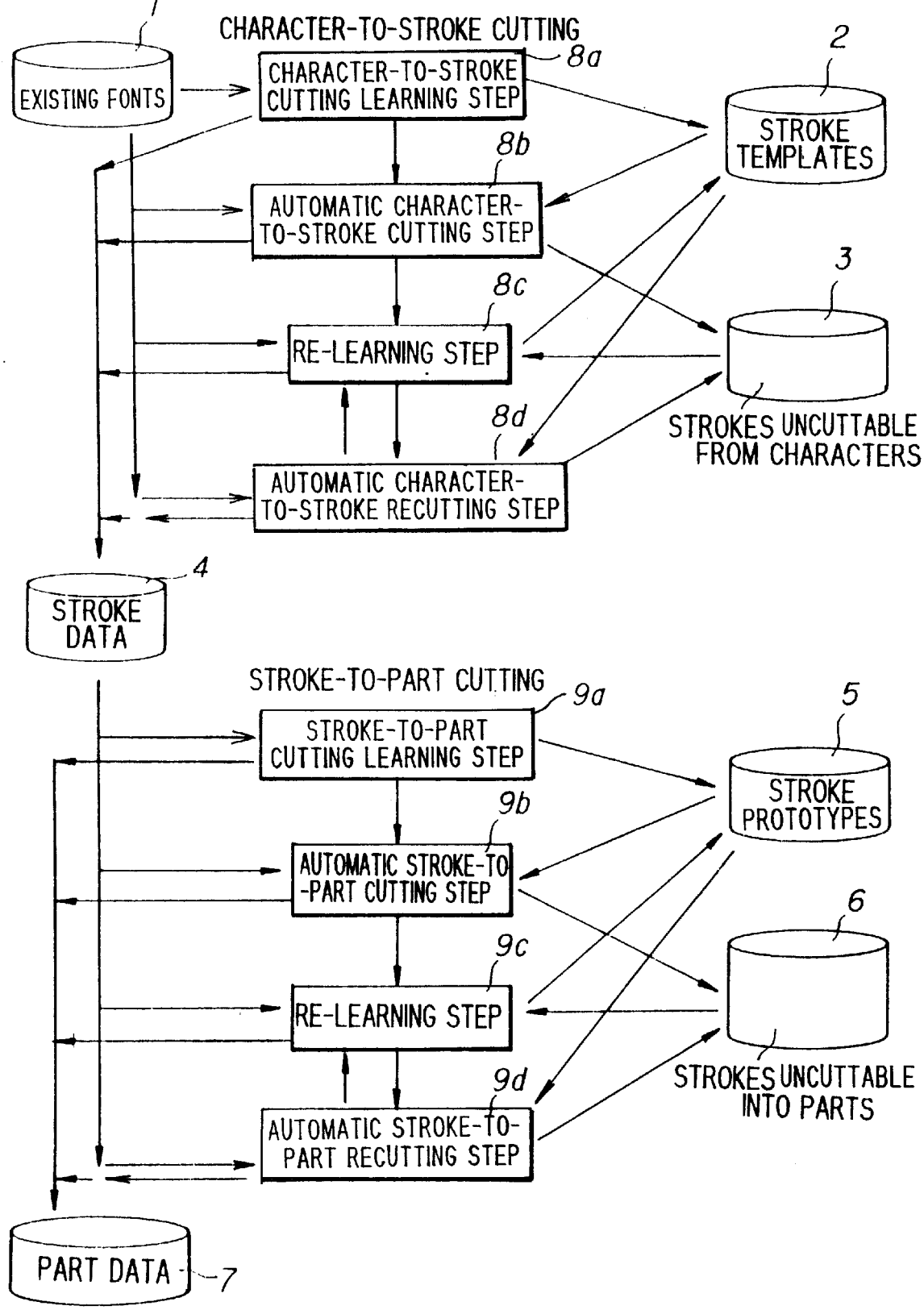
FIG. 1 is a diagram for describing an overview of the present invention.

FIG. 1 is a diagram for describing an overview of the present invention;, and FIG. 2 is a diagram for describing the strokes and parts of a character.

In FIG. 1, an existing-font storage unit 1 stores existing fonts that have not yet been cut, a stroke-template storage unit 2 stores stroke templates obtained by learning, an uncuttable-stroke storage unit 3 stores data (character codes and stroke numbers) specifying the strokes of characters that could not be cut into strokes automatically, a stroke-data storage unit 4 stores shape data representing strokes obtained by automatic cutting, a stroke-prototype storage unit 5 stores stroke prototypes obtained by learning, a parts-uncuttable stroke storage unit 6 stores data (character codes and stroke numbers) specifying stroke portions that could not be cut into parts automatically, and a parts-data storage unit 7 stores part-shape data obtained by automatic cutting.

Learning for cutting a character into strokes automatically is performed at a learning step 8a, and strokes are cut automatically from a character at an automatic character-to-stroke cutting step 8b based upon the knowledge obtained by learning. Several characters from among remaining characters that could not be cut automatically are cut into strokes by operator operation and re-learning is performed at a re-learning step 8c. Strokes are cut automatically from the remaining characters at an automatic character-to-stroke recutting step 8d based upon the knowledge obtained by re-learning.

Learning for cutting a stroke into parts automatically is performed at a learning step 9a, and parts are cut automatically from a stroke at an automatic part-cutting step 9b based upon the knowledge obtained by learning. Several strokes from among remaining strokes that could not be cut automatically are cut into parts by operator operation and re-learning is performed at a re-learning step 9c. Parts are cut automatically from the remaining strokes at an automatic part-re-cutting step 9d based upon the knowledge obtained by re-learning.

In FIG. 2, STi (i=1, 2, . . . ) represents a single stroke of a character, and PTij (i,j=1, 2, . . . ) represents a part constituting the stroke.

The shape of a stroke STi cut from a character by the operation of an operator is learned by storing the shape as the shape of a stroke template (step 8a). Each character is cut into strokes automatically based upon the shapes of the stroke templates that have been learned (step 8b). In a case where characters that cannot be cut into strokes automatically exist, the shapes of strokes cut from several of these characters, which could not be cut automatically, by operator operation are stored as the shapes of stroke templates (re-learning; step 8c). On the basis of the re-learned shapes of the stroke templates, strokes are cut automatically from the remaining, uncut characters (step 8d).

When the processing for cutting characters into strokes by the method described above is finished, the stroke STi is cut into the parts PTij by operator operation and the cutting method, cutting positions and stroke shapes that prevail at this time are learned by being stored as stroke prototype information (step 9a). Each stroke is cut into parts automatically based upon the prototype information that has been learned (step 9b). If strokes that could not be cut automatically exist, several of these strokes that could not be cut automatically are cut into parts by operator operation and the cutting method, cutting positions and stroke shapes that prevail at this time are learned by being stored as stroke prototype information (step 9c). On the basis of the re-learned prototype information, remaining, uncut strokes are cut into parts automatically (step 9d).

If the arrangement described above is adopted, the methods of the cutting strokes and parts need only be learned with regard to several characters and strokes, after which characters can be cut into strokes and strokes into parts automatically. As a result, an outline font which expresses a character by a collection of parts can be created efficiently. Since the outline font is expressed as a collection of parts, it is possible to perform control in such a manner that deterioration of the character will not occur or in such a manner that unnecessary portions will not be emphasized. This makes it possible to output a character exhibiting excellent legibility while the design possessed by the original outline font is preserved.

(B) OVERALL CONFIGURATION OF THE INVENTION (a) Construction

Figure 3:
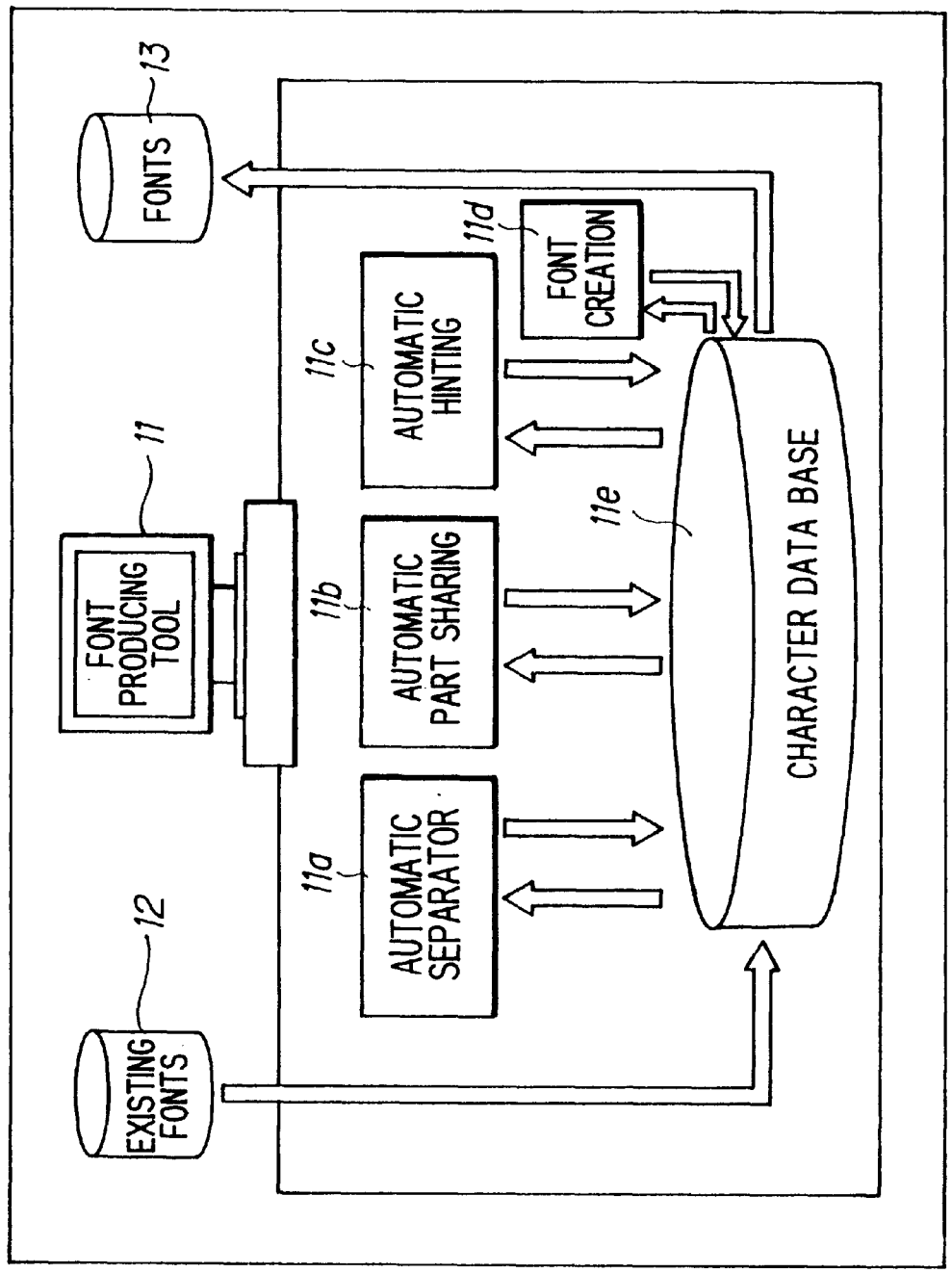
FIG. 3 is a diagram showing the architecture of a font producing tool.

FIG. 3 is a diagram showing the architecture of a font producing tool. The font producing tool divides an existing font into strokes, divides the strokes into parts and converts each character to a font (referred to as a "part-element font") expressed by a collection of parts.

Numeral 11 denotes the font producing tool, which includes an automatic separation unit 11a for dividing an existing font 12 into strokes and dividing the strokes into parts, an automatic part-sharing unit 11b which reduces the number of parts by making shared used of parts of identical shape, an automatic hint unit 11c for assigning hint information to each part, a font creating unit 11d for creating part-element fonts 13 which express each character by a collection of parts, and a character data base 11e. The character data base 11e stores (1) existing fonts that have been read in, (2) basic-stroke information of each character, (3) stroke template information and stroke prototype information (part templates) learned when characters are cut into strokes and strokes into parts, (4) stroke information and part information obtained by automatic character-to-stroke cutting processing and automatic stroke-to-part cutting processing, and (5) part-element fonts that have been created. It should be noted that since the basic-stroke information of each character can be used regardless of the style of type, an arrangement may be adopted in which this information is stored in a memory separate from the data base and a data base is provided for each style of type.

(b) Overview of Processing

The font producing tool 11 converts the existing font 12 to the part-element font 13 via a format conversion, automatic separation processing, automatic hint processing and font-file creation processing, in the order mentioned, and outputs the font 13.

(b-1) Format conversion

First, the existing outline font 12 possessed by the user is converted to the format of the font producing tool. All of the converted character information is stored in the character data base 11e. Separation processing (processing for cutting characters into strokes and strokes into parts), described later, is accompanied by generation of stroke and part data. All of these data are stored in the character data base 11e. Stroke classification codes and part classification codes are assigned to the separated strokes and parts. This makes it possible to access any item of data.

(b-2) Automatic separation

Separation is performed in two stages, one for cutting strokes from a character and one for cutting parts from the strokes. In automatic separation, first a learning mode is started up and the user cuts representative characters into strokes and cuts the strokes into parts on a control screen and causes the system to learn the rules for cutting the characters into these strokes and parts. Thereafter, when batch processing is started, the system cuts several thousand remaining characters into strokes and parts automatically in accordance with the rules learned. Since the rules for separation differ somewhat depending upon design, it is required that the learning mode be executed for each style of type. In the case of balanced Ming-style type, automatic separation has been realized at an efficiency of 70% with regard to separation of strokes from characters at an efficiency of 95% with regard to separation of parts from strokes. Even if a character has a special shape to which the results of learning cannot be applied, this can be dealt with by repeating the adding on of learning information and the execution of automatic separation so that it will be unnecessary for all remaining characters or strokes to be separated by a manual operation.

(b-3) Automatic parts sharing

Even kanji characters having a complex shape can be rendered into simple figures by being separated into strokes and then into parts. However, if 7000 characters were cut into strokes, the result would be about 91,000 strokes, and if all these strokes were cut into parts, the result would be about 210,000 parts, thereby necessitating a memory having a large storage capacity. Accordingly, parts whose shapes are regarded as being "almost identical" are shared. By executing processing to share parts, the total number of parts can be reduced to about 30,000, thus making it possible to exploit memory resources effectively. It is also possible to unify shapes by absorbing inconsistencies brought about by variance at the time of character design or by errors produced when signals are digitized.

(b-4) Automatic hints

Figure 4A:
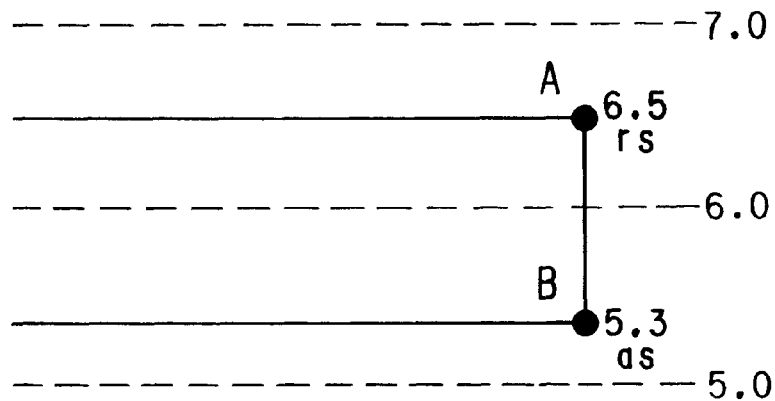
FIGS. 4A through 4C are diagrams for describing a stem hint.
Figure 4B:
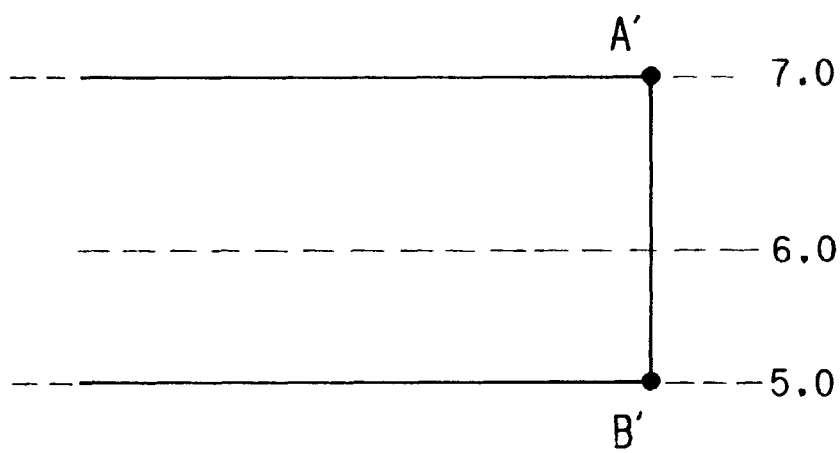
Figure 4C:
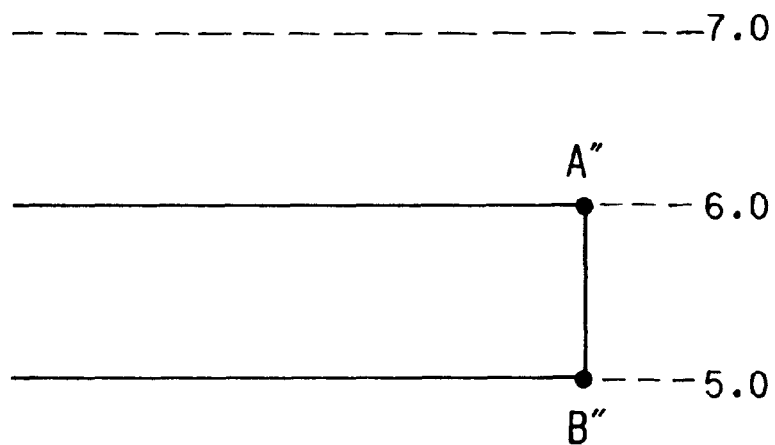

A hint is control information assigned to the coordinates of a contour which is important in terms of deciding quality. Examples of hints are a hint (referred to as a stem hint) for controlling line width, a hint (referred to as a scale hint) for controlling hari-portion of a Kanji character designed for a style of type, and a hint for clearly manifesting the roundness of rounded Gothic type. When the user adds on a hint in the learning mode in a manner similar to that of automatic separation, rule for adding on a hint is learned and hint information is added on automatically by applying the particular rule. FIGS. 4A through 4C are diagrams for describing a stem hint. Assume that when an outline font expressed by a logical coordinate system of 1000×1000 dots is reduced in size for the purpose of effecting a size conversion to a physical coordinate system of, say, 16×16 dots, the Y coordinates of points A, B have become 6.5 and 5.3, respectively, as shown in FIG. 4A. In such case the conversion is made to the physical coordinate system by rounding off each of the Y coordinates to the nearest whole number (i.e., by applying a grid correction). As a result, the Y coordinate of point A becomes 7, the Y coordinate of point B becomes 5 and the line width becomes 2, as shown in FIG. 4B. However, since the actual line width is 1.2 (=6.5−5.3), this is rounded off to 1. Thus, if hint control of some kind is not applied, the line width will become 2 and the output thereof will be too thick. The result will be the output of a character that is widely different from the character originally designed. In other words, character quality declines.

Accordingly, absolute stem hint information as is assigned to point A of the outline font, and relative hint information rs is assigned to the point B of the outline font. When such hint information is assigned, the effects are as follows: When the Y coordinate of point A to which the absolute stem hint as has been assigned is rounded off to 5, the discarded fraction 0.3 (=5.3−5.0) is subtracted from the Y coordinate 6.5 of point B to which the relative hint information has been assigned, with the result that 6.2 (6.5−0.3) is rounded off to the nearest whole number. Accordingly, the Y coordinate of point B becomes 6 and the line width can be made 1, as shown in FIG. 4C. This makes it possible to prevent a decline in character quality.

Figure 5A:
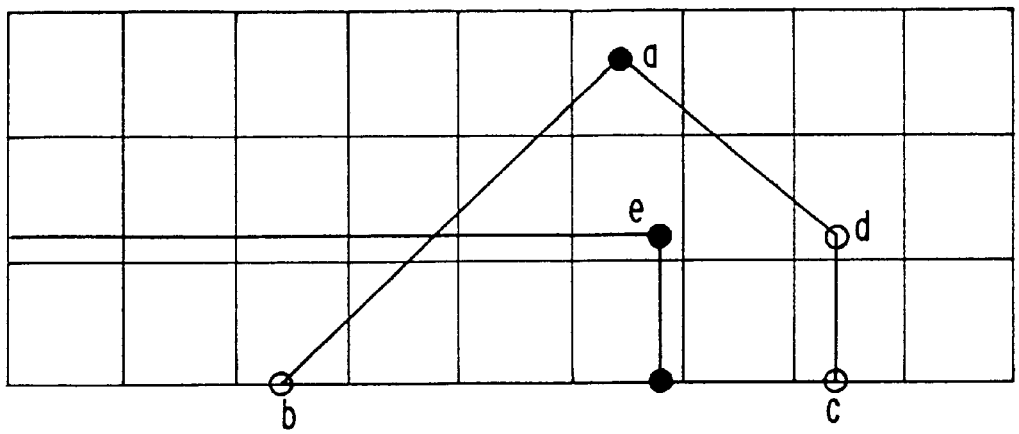
FIGS. 5A through 5C are diagrams (part 1) for describing a scale hint.
Figure 5B:
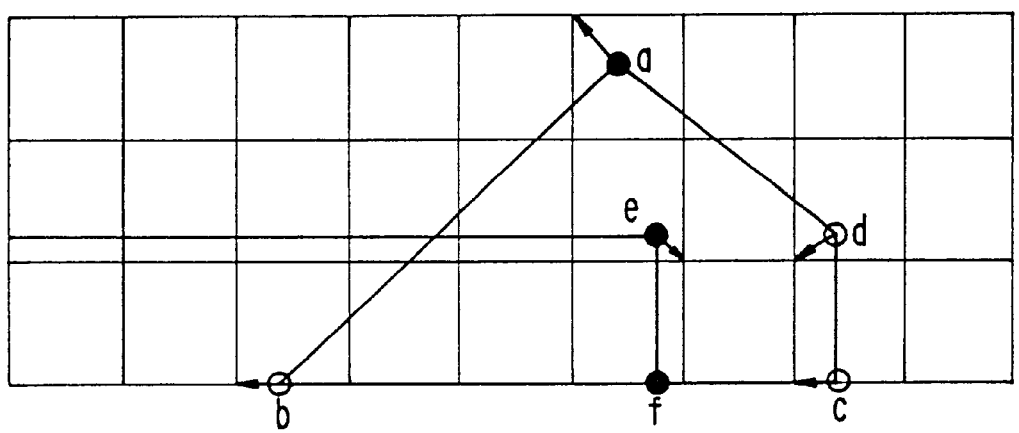
Figure 5C:
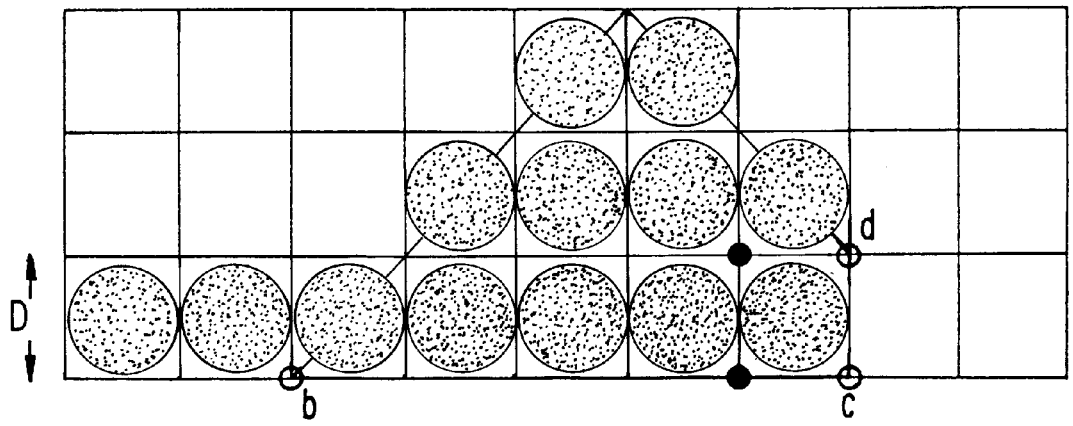
Figure 6A:
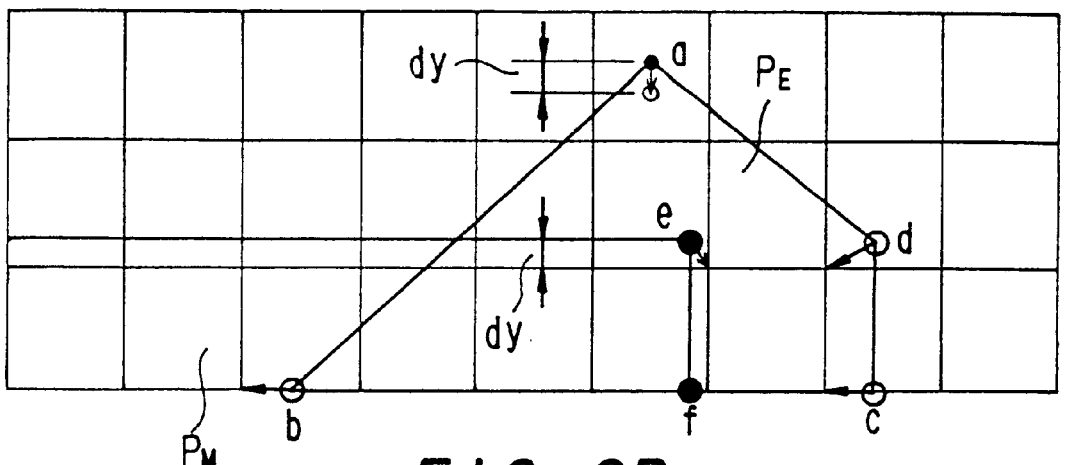
FIGS. 6A through 6C are diagrams (part 2) for describing a scale hint.
Figure 6B:
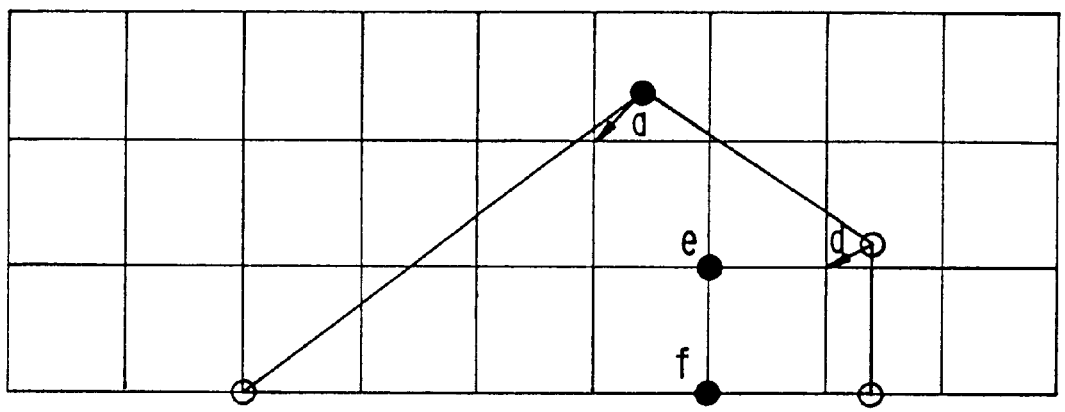
Figure 6C:
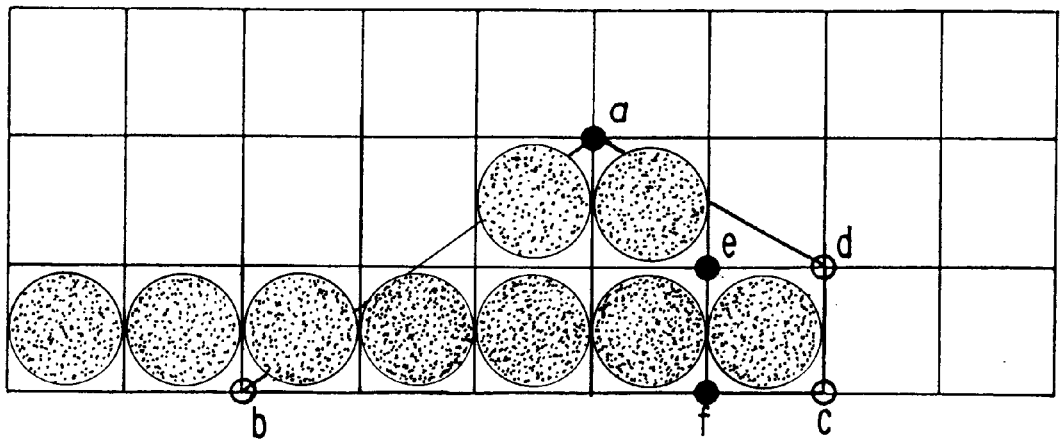

FIGS. 5A through 5C and FIGS. 6A through 6C are diagrams for describing a scale hint. In a case where outline font data are reduced or enlarged in a logical coordinate system, results of the kind shown in FIG. 5A are obtained as the coordinates of each point on the curves. With the conventional method, the coordinates of each point in the logical coordinate system are rounded off to the nearest whole numbers (by the grid correction) to implement the conversion to the physical coordinate system, as shown in FIG. 5B, and a bitmap is obtained based upon these data in the physical coordinate system, as depicted in FIG. 5C. According to this conventional method, however, the dot representation of the scales is enlarged when the grid correction is applied, the scales become larger than the stem width D of the stroke and the character balance is lost. Accordingly, when the grid correction is applied at scale point a, a change dy, which is produced when the Y coordinate value of point e possessing the stem hint is subjected to the grid correction, is added to the Y coordinate value of the point a of the scale hint, as illustrated in FIG. 6A. As a result, the distance between the stem hint point e of a middle part $P_M$ and the scale hint a of an end part $P_E$ in the logical coordinate system is preserved. The Y coordinate of the scale hint point a is subjected to the grid correction under these conditions, as depicted in FIG. 6B. Thereafter, a bitmap is generated, as shown in FIG. 6C, based upon the grid-corrected data in the physical coordinate system. If this arrangement is adopted, the dot representation of the scales becomes smaller and a decline in character quality can be prevented.

(c) Hardware Configuration of Font Producing Tool

Figure 7:
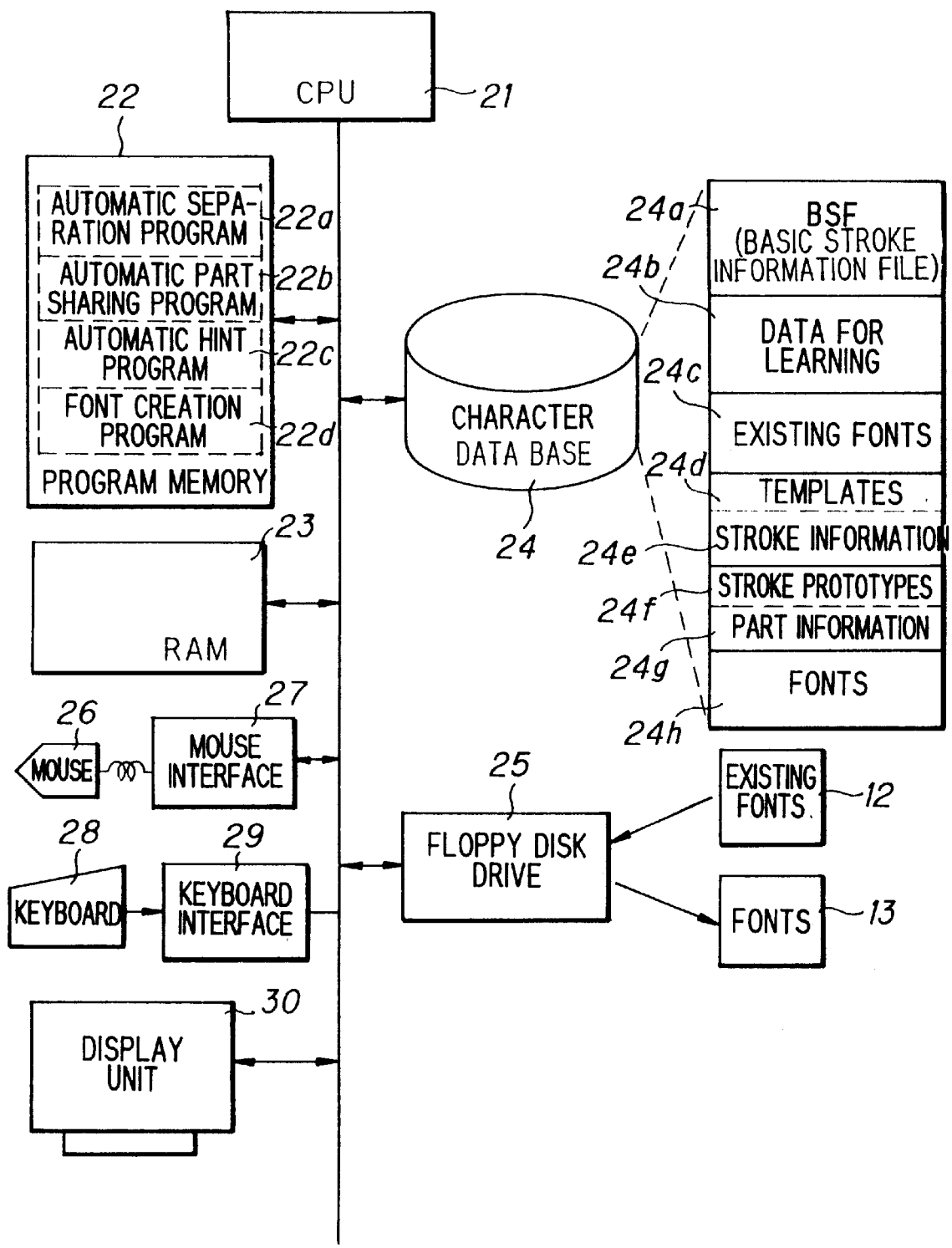
FIG. 7 is a diagram showing the hardware implementation of the font producing tool.

FIG. 7 is a diagram showing the hardware implementation of the font producing tool. The tool includes a processor (CPU) 21, a program memory 22 for storing an automatic separation program 22a, an automatic part sharing program 22b, an automatic hint program 22c and a font creating program 22d, a RAM 23, a character data base (which corresponds to the data base 11e in FIG. 3) 24 consisting of a hard disk or the like, a floppy disk drive 25 for reading in an existing font file 12 and outputting a produced font file 13, a mouse 26, a mouse interface 27, a keyboard 28, a keyboard interface 29 and a display unit 30. A magnetic tape device can be used instead of the floppy disk drive.

The following information is stored in the character data base 24:

(1) a basic stroke file (BSF) 24a containing basic stroke information for each character;

(2) a learning-data file 24b for designating the stroke portions of several characters used in the learning of stroke cuts and part cuts;

(3) an existing font file 24c that has been read in;

(4) stroke template information 24d obtained in a learning operation, which is a preliminary operation for cutting a character into strokes automatically;

(5) stroke information 24e obtained by processing for cutting a character into strokes automatically;

(6) stroke prototype information 24f obtained in a learning operation, which is a preliminary operation for cutting a stroke into parts automatically;

(7) part information 24g obtained by processing for cutting strokes into parts automatically; and (8) a produced font file 24h.

It should be noted that the produced font file 24h can be stored in another memory as a separate file.

(d) Control Screen When Automatic Separation is Performed (d-1) Control screen

Figure 8:
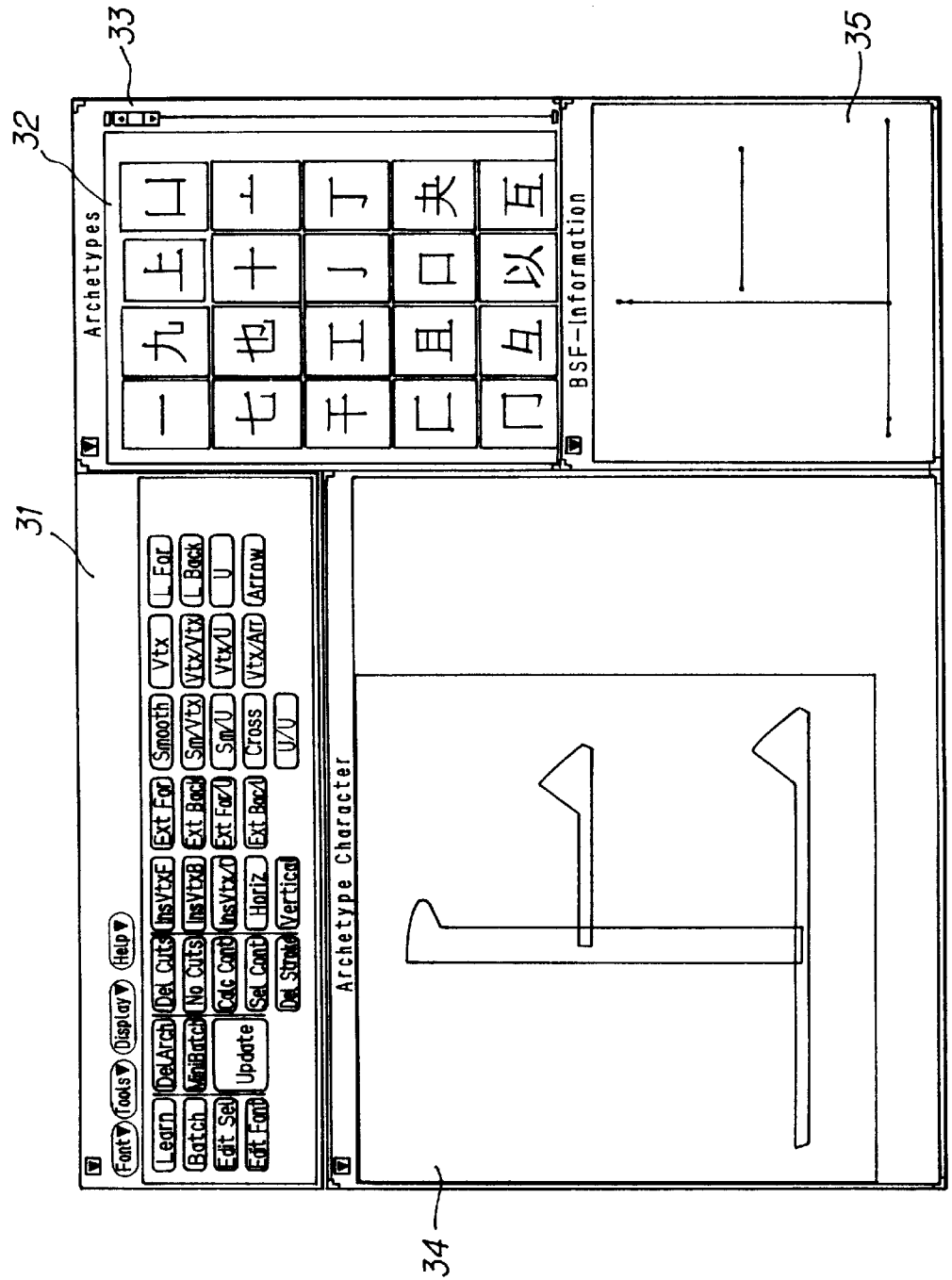
FIG. 8 shows a display screen of character-to-stroke cutting at the time of a learning operation.
Figure 9:
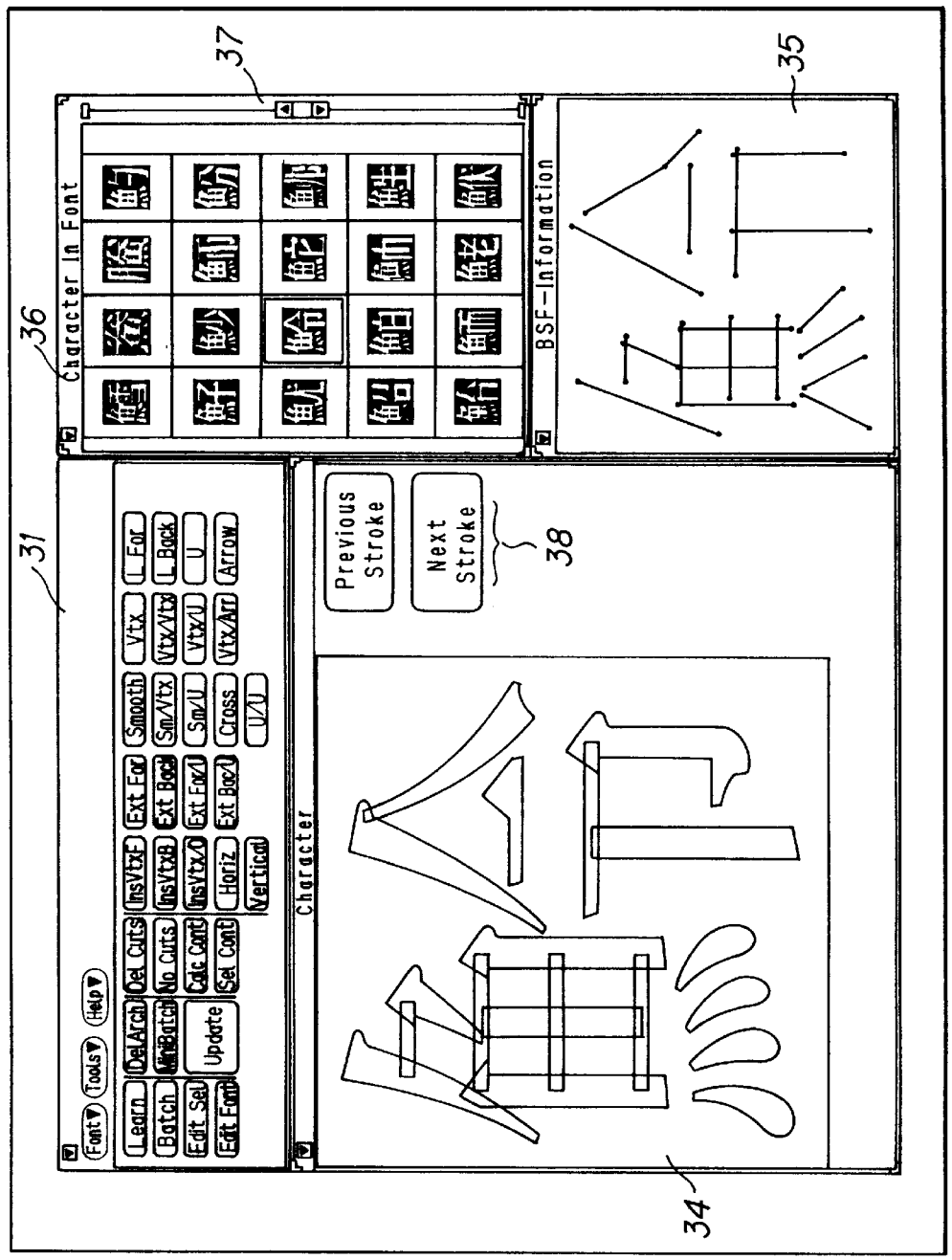
FIG. 9 shows a display screen of character-to-stroke cutting at the time of a re-learning operation.

FIGS. 8 and 9 are diagrams for describing control screens displayed when a character is cut into strokes, in which FIG. 8 is a control screen used at the time of learning and FIG. 9 is a control screen used at the time of re-learning.

As shown in FIG. 8, the display screen includes a key window 31 for displaying various menu keys, an archetype display window 32 for displaying all 4×5 archetype characters, a scrolling portion 33 for scrolling characters in the archetype display window 32, a character window 34 for displaying a character image outputted in accordance with the outline data of a selected character, and a basic stroke file window (BSF window) 35 for displaying basic strokes based upon the basic stroke information BSF of a selected character.

As shown in FIG. 9, the display screen includes the key window 31, the character window 34 for displaying a character image selected in accordance with outline data, the basic stroke file window (BSF window) 35 for displaying basic strokes, a character list window 36 for displaying a list of characters that could not be cut into strokes automatically, a scrolling portion 37 for scrolling the characters in the character list window 36, and a stroke forward/backward portion for selecting the previous stroke or the next stroke.

Figure 10:
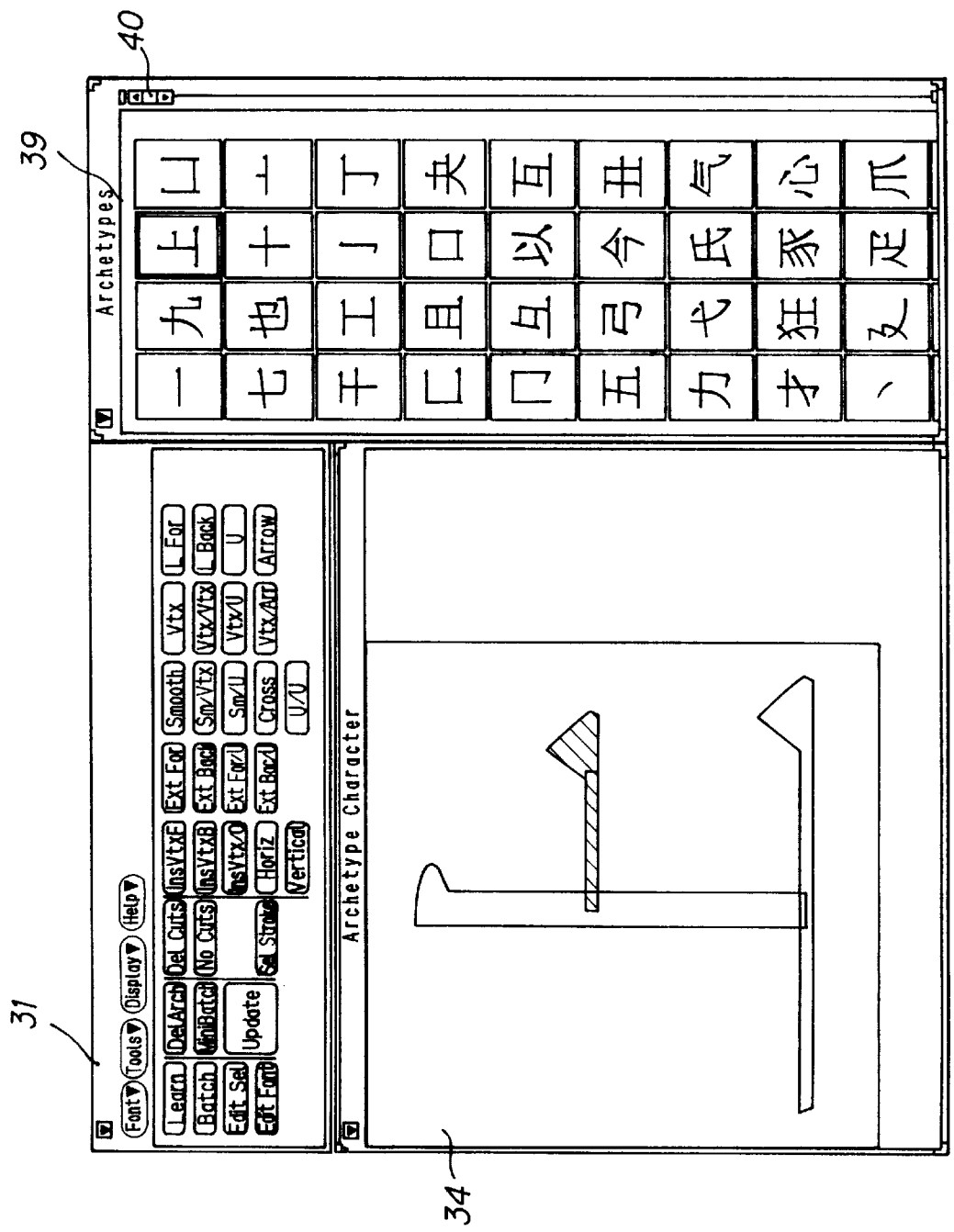
FIG. 10 shows a display screen for a stroke-to-part cutting operation.

FIG. 10 is a diagram for displaying a control display screen used when cutting a stroke into parts.

As shown in FIG. 10, the display screen includes the key window 31, the character window 34 for displaying a character separated into strokes, an archetype display window 39 for displaying all 4×9 archetype characters, and a scrolling portion 40 for scrolling the characters in the archetype display window 39.

Processing for cutting a character into strokes is executed via the following modes:

(1) a learning mode in which the stroke portions of a predetermined character are cut by the user on the screen so that the system will be made to learn basic stroke templates;

(2) a batch mode in which a character is cut into strokes automatically in accordance with stroke templates that have been learned;

(3) a re-learning mode in which several stroke portions of the stroke portions of a character which could not be batch-processed are cut by the user on the screen so that the system will be made to learn the stroke templates; and (4) a mini-batch mode in which characters which could not be cut into strokes are cut into strokes automatically in accordance with the stroke templates that have been re-learned.

Processing for cutting a stroke into parts is executed via the following modes:

(1) a learning mode in which a stroke is cut into parts by the user on the screen so that the system will be made to learn basic stroke prototypes;

(2) a batch mode in which a stroke is cut into parts automatically in accordance with the basic stroke prototypes that have been learned;

(3) a re-learning mode in which several strokes of strokes which could not be batch-processed are cut into parts by the user on the screen so that the system will be made to learn the stroke prototypes; and (4) a mini-batch mode in which strokes which could not be cut into parts are cut into parts automatically in accordance with the stroke prototypes that have been re-learned.

Various menu keys for executing the above-described stroke cuts and part cuts are displayed in the window 31 on the control screen. These menu keys are classified broadly into keys relating to processing mode selection, keys (cut operators) relating to cutting operations, and deletion keys for canceling the cutting operation.

Examples of the keys relating to the processing mode are as follows:

Learn key: establishes the learning mode;

Edit Sel key: displays a character having a stroke which could not be cut

Minibatch key: establishes the mini-batch processing mode

Batch key: establishes the batch mode

Edit Font key: displays a list of characters in a font file

The cutting operation deletion keys are a Del Arch key, a Del Stroke key and a Del Cuts key. These keys have the functions set forth below.

Del Arch key: This key can be used in both a stroke cutting (character-to-stroke) mode and a parts cutting (stroke-to-parts) mode. The Del Arch key is used to delete archetypes that cannot be used as standard rules. After automatic cutting is executed, the Learn key is clicked, an archetype desired to be deleted is selected from the archetype display window 32 and the Del Arch key is clicked.

Del Stroke: This key can be used in the character-to-stroke mode. The key is for deleting the cutting of strokes, which have already been cut. Selection of a stroke is verified in the BSF window 35 and the Del Stroke key is clicked.

Del Cuts: This key, which can be used in both the character-to-stroke mode and stroke-to-parts mode, is for deleting the cutting of strokes and parts. The Del Cuts key is clicked when a character is being displayed in the character window.

The cut operators are employed to allow the user to cut strokes from a character on the control screen in the learning mode and to allow the user to cut parts from strokes on this screen.

(d-2) Basic cutting methods

The fundamentals of the cutting methods are as shown in FIGS. 11A through 11J. The fundamental cuts are a horizontal cut, a vertical cut, an extended-line cut, an insert-vertex cut, an extended-to-vertex cut, a smooth cut, a U or Z cut, an L cut and an arrow cut.

Figure 11A:
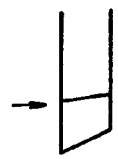
FIGS. 11A through 11J are diagrams for describing a basic cutting method.

(1) As shown in FIG. 11A, a horizontal cut involves cutting a stroke from a character or a part from a stroke by effecting a cut horizontally from a point designated by the mouse cursor.

Figure 11B:

(2) As shown in FIG. 11B, a vertical cut involves cutting a stroke from a character or a part from a stroke by effecting a cut vertically from a point designated by the mouse cursor.

Figure 11C:

(3) As shown in FIG. 11C, an extended-line cut involves cutting a stroke from a character or a part from a stroke by extending the outline in the counter-clockwise or clockwise direction from a designated point and then extending the extension line until it intersects another outline.

Figure 11D:

(4) As shown in FIG. 11D, an insert-vertex cut involves cutting a stroke from a character or a part from a stroke by designating two points, extending a tangent line, which extends in the clockwise (or counter-clockwise) direction and is tangent to the outline at the first designated point, and extending an extension line, which extends in the counter-clockwise (or clockwise) direction, of the outline at the second designated point, until the tangent line and the extension line intersect.

Figure 11E:
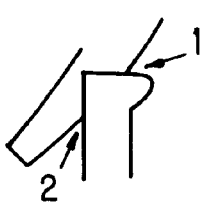

(5) As shown in FIG. 11E, an extended-to-vertex cut involves cutting a stroke from a character or a part from a stroke by designating two points, extending an extension line of the outline at the first designated point in the counter-clockwise direction and extending an extension line of the outline at the second designated point in the clockwise direction until the extension lines intersection each other.

Figure 11F:

(6) As shown in FIG. 11F, a smooth cut involves cutting a stroke from a character or a part from a stroke by smoothly connecting two designated points.

Figure 11G:
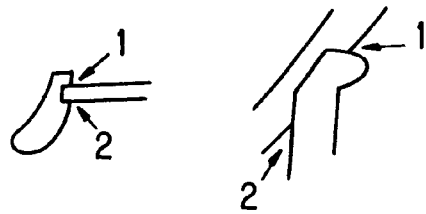
Figure 11H:
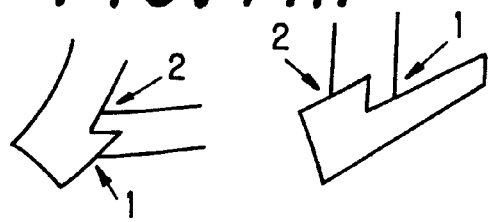

(7) As shown in FIGS. 11G and 11H, a U or Z cut involves cutting a stroke from a character or a part from a stroke by designating two points, extending the extension line of the outline at the first designated point in the counter-clockwise direction and extending the extension line of the outline at the second designated point in the clockwise direction until they intersect predetermined vertical, horizontal or diagonal lines, and making the cut in such a manner that the section of the cut defines a generally U- or Z-shaped form.

Figure 11I:
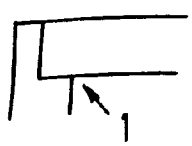

(8) As shown in FIG. 11I, an L cut involves cutting a stroke from a character or a part from a stroke by extending a counter-clockwise or clockwise extension line of the outline at a designated point until the extension line intersects a predetermined vertical line or horizontal line, and making the cut in such a manner that the section of the cut defines a generally L-shaped form.

Figure 11J:
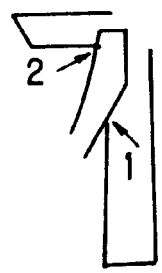

(9) As shown in FIG. 11J, an arrow cut involves cutting a stroke from a character or a part from a stroke by designating two points, extending an extension line of the outline at the first designated point in the counter-clockwise direction and extending an extension line of the outline at the second designated point in the clockwise direction until the extension lines intersect predetermined vertical or horizontal lines, and making the cut in such a manner that the section of the cut defines a generally arrow-shaped form.

(d-3) Cut operators

As shown in FIGS. 12A~12E, FIGS. 13A~13D and FIGS. 14A~14D, there are 21 types of cut operators, which depend upon the types and shapes of strokes. These cut operators are for cutting strokes from characters and parts from strokes by individual ones of the above-mentioned fundamental methods or by a combination of two of the fundamental methods.

(1) Horiz

Figure 12A:
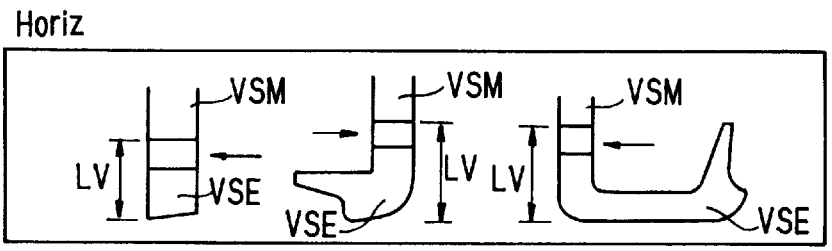
FIGS. 12A through 12E are diagrams (part 1) for describing cut operators.

The cut operator Horiz makes a cut by the horizontal cutting method. As shown in FIG. 12A, the cut operator Horiz is used when making a horizontal cut between the middle portion VSM and end portion VSE of a vertical stroke. The cut operator Horiz is selected by the mouse, a cutting position is then selected at one point by the mouse cursor and the mouse is clicked, thereby effecting the horizontal cut. In the learning mode, a length LV from the cutting position to the lowermost point is saved and applied in automatic cutting processing.

(2) Vertical

Figure 12B:
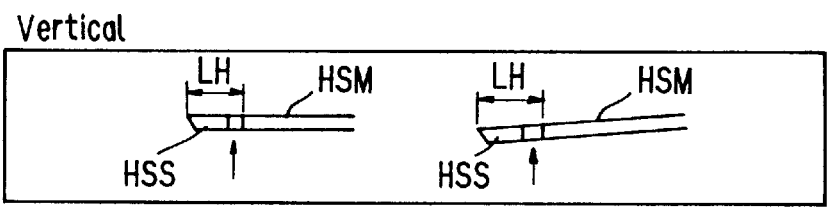

The cut operator Vertical makes a cut by the vertical cutting method. As shown in FIG. 12B, the cut operator Vertical is used when making a vertical cut between the starting portion HSS and middle portion HSM of a horizontal stroke. The cut operator Vertical is selected by the mouse, a cutting position is then selected at one point by the mouse cursor and the mouse is clicked, thereby effecting the vertical cut. In the learning mode, a length LH from the cutting position to the leftmost point is saved and applied in automatic cutting processing.

(3) Ext For

Figure 12C:
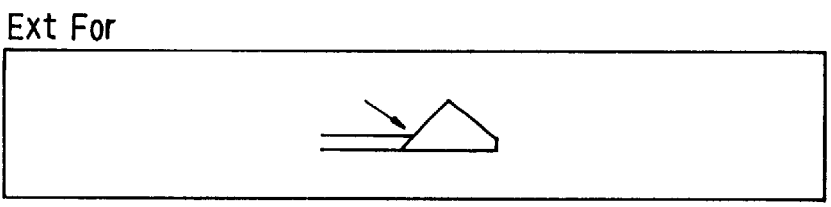

The cut operator Ext For makes a cut by the extended-line cutting method. As shown in FIG. 12C, a part is formed by extending a segment and cutting along the extended segment which crosses a contour line. It should be noted that Ext For is the abbreviation of "Extend Forward". The contour line of the outline font is defined in the counter-clockwise direction. Ext For means to extend the segment in the forward direction (counter-clockwise direction) and cut a stroke from a character or a part from a stroke along the extended segment.

(4) Ext Back

Figure 12D:
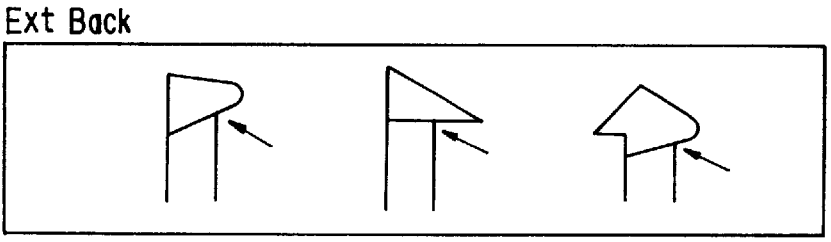

The cutting method based upon the cut operator Ext Back is the same as that based upon the cut operator Ext For, as shown in FIG. 12D. A part is formed by extending a segment and cutting along the extended segment which crosses a contour line. The difference between Ext Back and Ext For is the direction in which the segment is extended. It should be noted that Ext Back is the abbreviation of "Extend Backward". Ext Back means to extend the segment in the clockwise direction.

(5) Ins Vtx

Figure 12E:
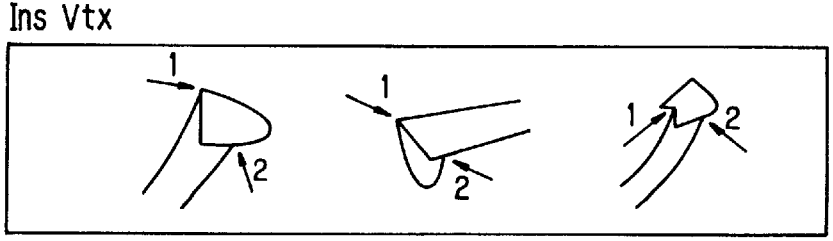

The cut operator Ins Vtx makes a cut by the insert-vertex cutting method. As shown in FIG. 12E, two points are selected and extended into the interior of the contour until two extended lines intersect each other, and a part is formed by cutting along the extended lines.

(6) Ins Vtx/O

Figure 13A:
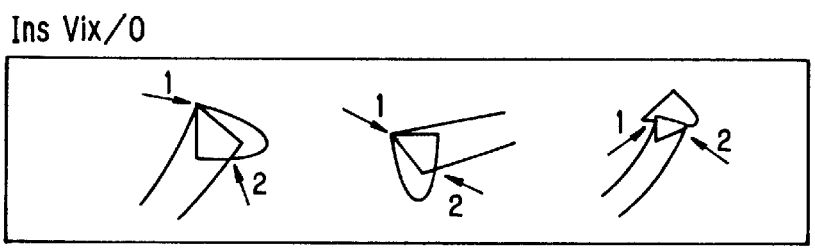
FIGS. 13A through 13D are diagrams (part 2) for describing cut operators.

The cutting method of the cut operator Ins Vtx/O is similar to that of the cut operator Ins Vtx, as shown in FIG. 13A. Specifically, one stroke portion from the two designated points is cut by the insert-vertex cutting method and the other stroke portion is cut by the insert-vertex cutting method upon reversing the direction of the segment extension. In other words, the cut operator Ins Vtx/O cuts two stroke portions at one time.

(7) U

Figure 13B:
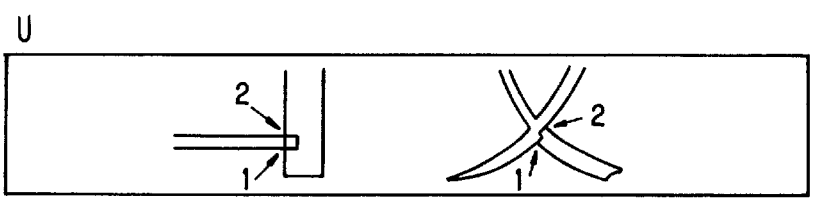
Figure 13C:
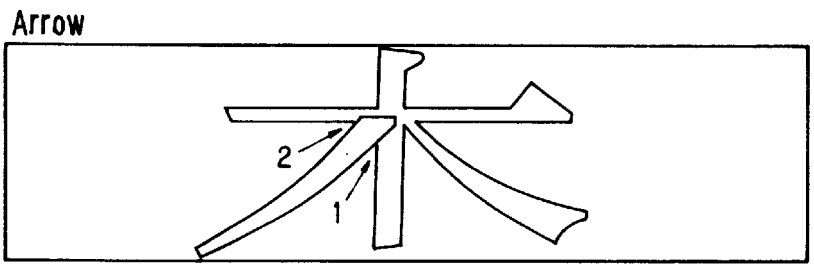

The cut operator U makes a cut by the U cutting method. As shown in FIG. 13B, segments are extended in the same direction, the points of intersection with a predetermined vertical line or horizontal line are connected by a straight line and cutting is performed along the line. The section of the cut is not limited to a U-shaped cut. Linear cuts having different levels and cuts along a single straight line are possible as well.

(8) Arrow

The arrow cut operator Arrow makes a cut by the arrow cutting method. As shown FIG. 13C, the outline is extended at two designated points and cutting is performed in such a manner that the section of the cut defines a right-angled arrow. The stroke is cut into the shape of an arrow in such a manner that the extended segment will not extend beyond the boundaries of the contours of other strokes.

(9) Cross

Figure 13D:
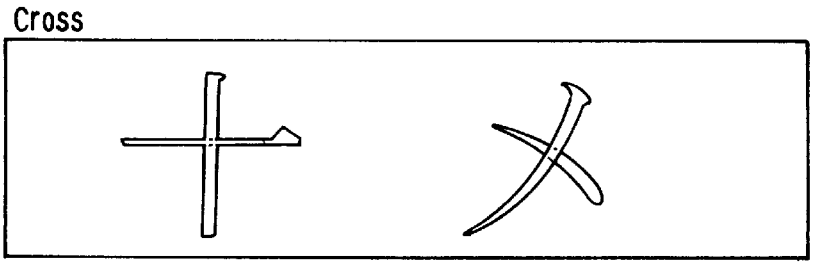

The cut operator Cross cuts the intersection between strokes, as shown in FIG. 13D.

(10) Smooth

Figure 14A:
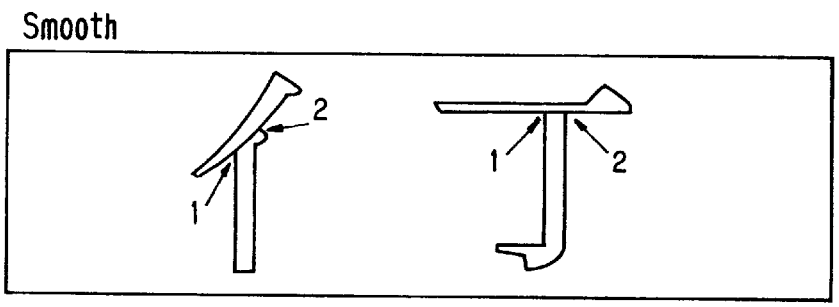
FIGS. 14A through 14D are diagrams (part 3) for describing cut operators.

The cut operator Smooth makes a cut by the smooth cutting method. As shown in FIG. 14A, two points are selected, an interrupted segment is extended, the two points are smoothly connected and cutting is performed along the line.

(11) Vtx

Figure 14B:
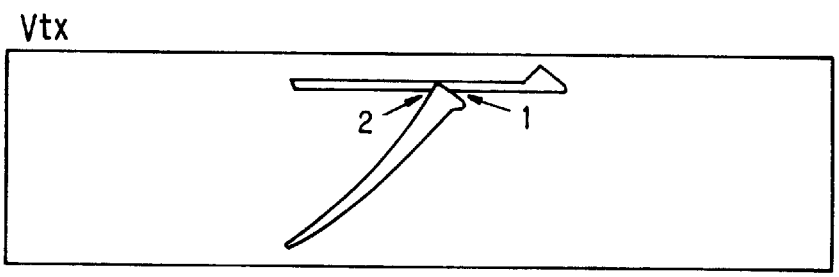
Figure 14C:
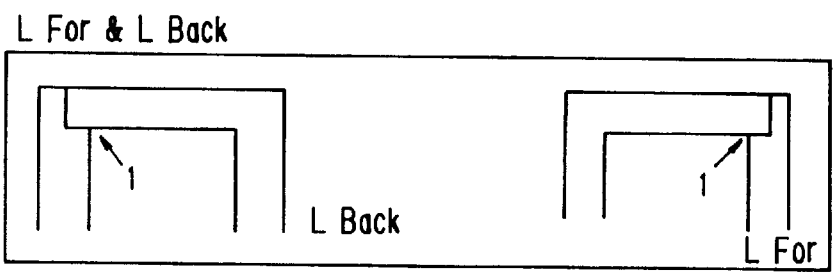
Figure 14D:
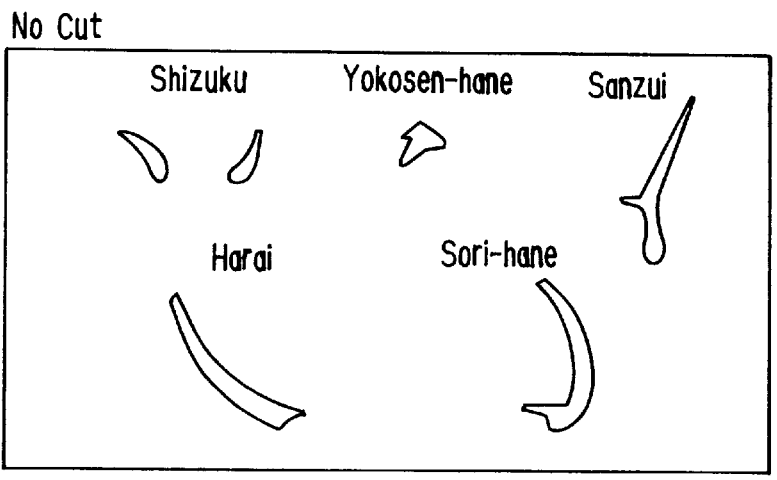

The cut operator Vtx makes a cut by the extended-to-vertex cutting method. As shown in FIG. 14B, cutting is performed by adopting, as a vertex, the point of intersection between the extensions of outlines at two designated points.

(12) L For

The cut operator L For makes a cut by the L cutting method. As shown on the right side of FIG. 14C, a segment is extended in the forward direction (counter-clockwise direction) from a selected point and the cut is made in such a manner that the section of the cut will define an L-shaped form.

(13) L Back

The cut operator L Back makes a cut by the L cutting method. As shown on the left side of FIG. 14C, a segment is extended in the clockwise direction from a selected point and the cut is made in such a manner that the section of the cut will define an L-shaped form.

(14) No Cut

The cut operator No Cut is used in cases where cutting is unnecessary, namely for kanji elements "SHIZUKU", "HARAI", "YOKOSEN-HANE", "SORI-HANE" and "SANZUI", etc.

The above-mentioned cut operators are for cases where the fundamental cutting methods are applied singly. However, cut operators for cutting two strokes from a character by making a cut a single time using a combination of fundamental cutting methods are also prepared. These cut operators have a name obtained by dividing the names of two fundamental cut operators using the "/" symbol. Cuts can be made simultaneously by the cutting methods conforming to these two fundamental cut operators. Examples of such combined cut operators are as follows:

(15) Ext For/U

The cut operator Ext For/U is for performing cutting based upon a combination of the cut operators Ext For and U.

(16) Ext Back/U

The cut operator Ext Back/U is for performing cutting based upon a combination of the cut operators Ext Back and U.

(17) Sm/Vtx

The cut operator Sm/Vtx is for performing cutting based upon a combination of the cut operators Smooth and Vtx.

(18) Sm/U

The cut operator Sm/U is for performing cutting based upon a combination of the cut operators Smooth and U.

(19) Vtx/Vtx

The cut operator Vtx/Vtx is for performing cutting based upon a combination of the cut operators Vtx and Vtx.

(20) Vtx/U

The cut operator Vtx/U is for performing cutting based upon a combination of the cut operators Vtx and U.

(21) Vtx/Arr

The cut operator Vtx/Arr is for performing cutting based upon a combination of the cut operators Vtx and Arrow.

(C) AUTOMATIC SEPARATION PROCESSING

Figure 15:
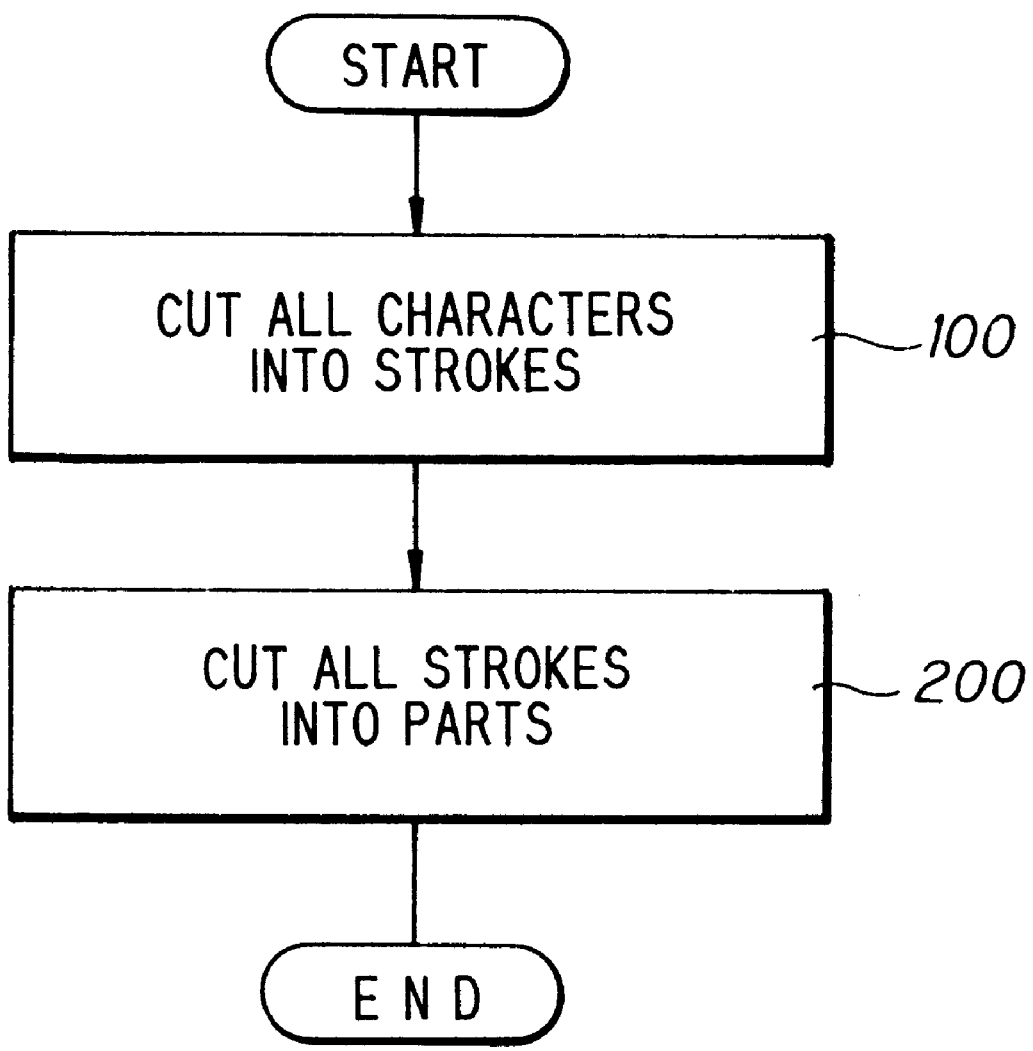
FIG. 15 shows the overall flow of separation processing.

In automatic separation processing, as shown in FIG. 15, first all characters are cut into strokes (step 100; stroke cutting processing) and then all strokes obtained by stroke cutting processing are cut into parts (step 200; part cutting processing).

(a) Stroke Cutting Processing

Figure 16:
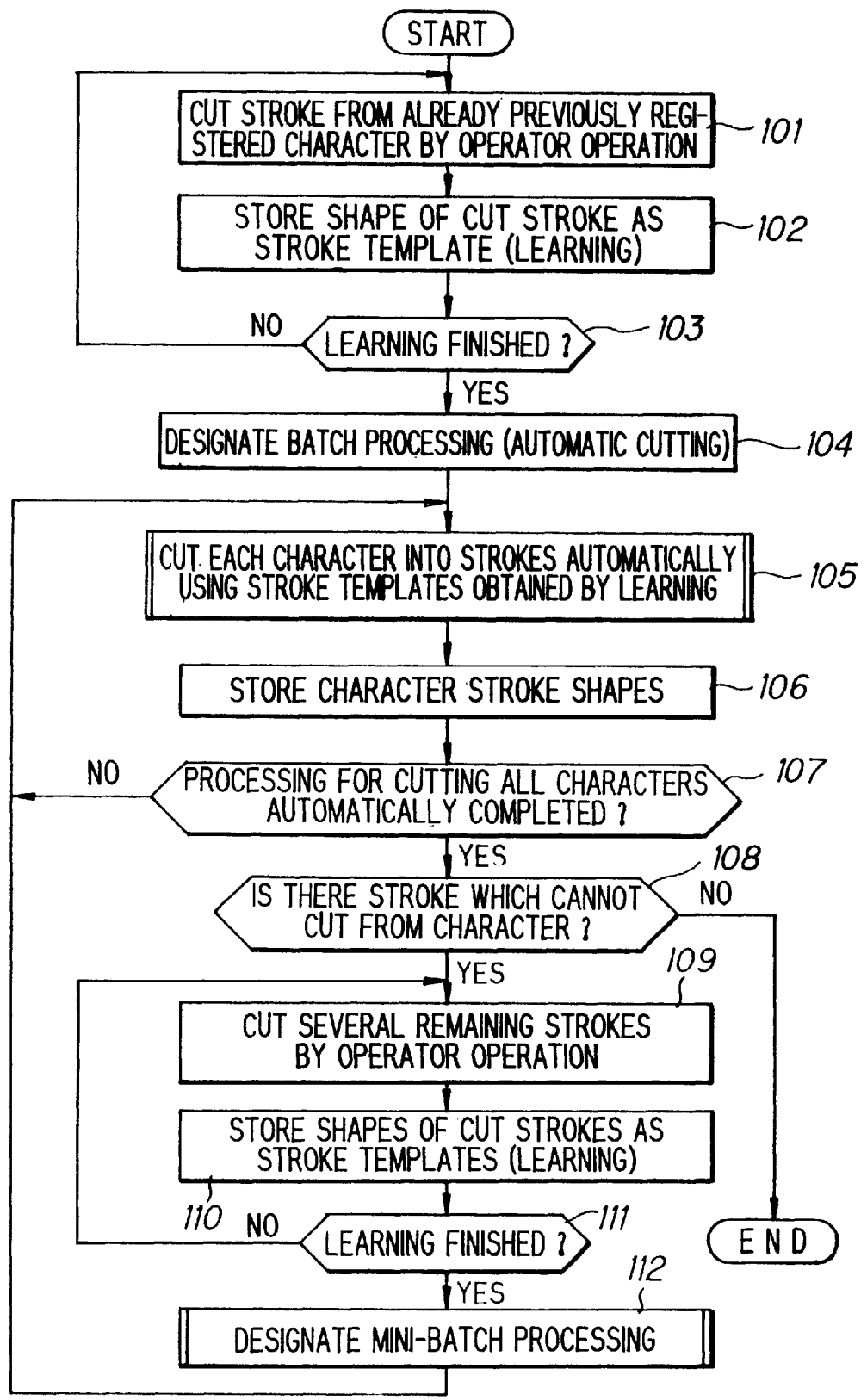
FIG. 16 shows the flow of character-to-stroke cutting processing.

FIG. 16 is a flowchart of stroke cutting processing. In the learning mode, which strokes of which characters are to be cut by the user on the screen are registered in the system in advance. For example, if, say, 63 archetypes are to be learned, a character code and stroke number for specifying a stroke conforming to each archetype are registered in the system beforehand.

First, the stroke cutting mode (character-to-stroke mode) is opened and the Learn key is selected to establish the learning mode. As a result, the system opens the archetype display window 32 (see FIG. 8) to display the list of 63 archetypes that have been registered in the system. Under these conditions, the user selects an archetype, which is to be cut into strokes, in the archetype display window and double clicks on the archetype using the mouse, whereupon the system displays the character of this archetype in the character window 34. Further, the system displays the basic stroke information BSF of this character in the BSF window 35 and causes the stroke portions (archetypes) conforming to the registered stroke numbers to be displayed by red lines in the character window 34.

Next, the user cuts a stroke, which corresponds to the archetype that is being indicated by the red line, in the character window 34 using a cut operator. When cutting by the cut operator is executed, the system causes the stroke that is cut to be displayed in blue. If cutting is to be performed at a plurality of locations, cutting based upon cut operators is carried out in successive fashion. This corresponds to step 101 in FIG. 16.

After a stroke has been cut from a character, the user clicks on a Calc Cont key. As a result, the system changes the stroke at a cut position displayed in blue to a black display and generates a contour of the cut stroke. Thereafter, the user clicks on an Update key, whereupon the system stores the results of learning (the cut stroke shape, etc.) in the character data base as a stroke template (step 102).

Figures 17, 18:
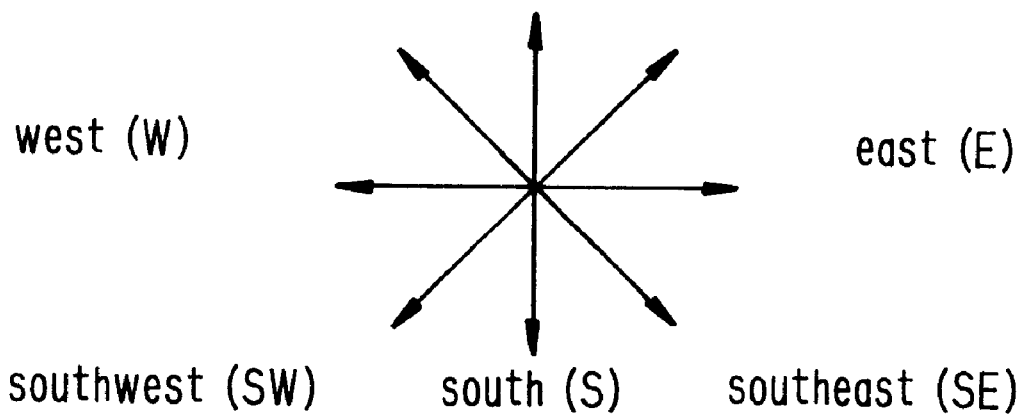
FIG. 17 is a diagram for describing stroke template information.
FIG. 18 is a diagram for describing direction codes.

As shown in FIG. 17, stroke template information is composed of (1) stroke archetype, (2) direction data indicating the direction of the outline at each curve point when the outline of the stroke is traced in the counter-clockwise direction, and (3) overlap data indicating whether the portion of a curve point overlaps another stroke. Directions are expressed by direction codes indicating the eight directions of east (E), northeast (NE), north (N), northwest (NW), west (W), southwest (SW), south (S) and southeast (SE).

FIGS. 19A, 19B through FIGS. 22A, 22B are diagrams for describing stroke template information in various archetypes.

Figures 19A, 19B:
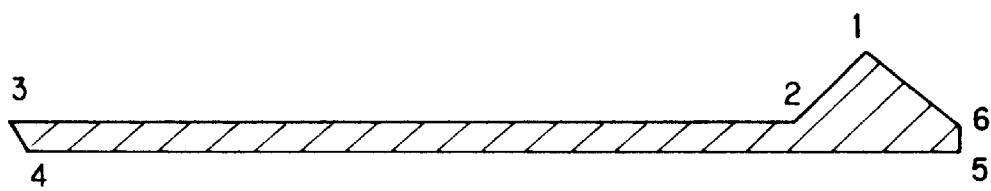
FIGS. 19A, 19B are diagrams (part 1) for describing stroke template information.

FIGS. 19A, 19B are diagrams for describing stroke template information in an archetype 4001 (stroke code 4=horizontal stroke, classification 1). The stroke template information includes a left-direction code, a right-direction code and an overlap YES/NO indication of each curve point (template points 1~6) arrayed in the counter-clockwise direction. The left-direction code indicates the direction of a shape element extending in the counter-clockwise direction from a template point of interest, and the right-direction code indicates the direction of a shape element in the right-hand direction from a template point of interest. Though not shown, information is included for indicating whether a template point is a min point, max point along the X and Y axes or a corner point.

Figures 20A, 20B:
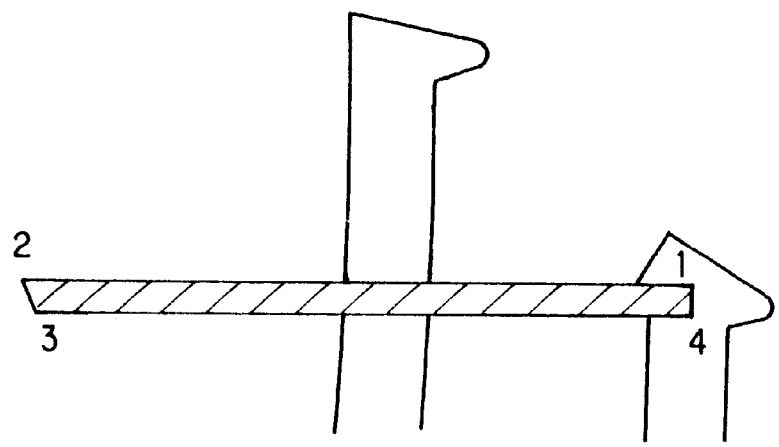
FIGS. 20A, 20B are diagrams (part 2) for describing stroke template information.

FIGS. 20A, 20B are diagrams for describing stroke template information in an archetype 4002 (stroke code 4=horizontal stroke, classification 2). The stroke template information includes a left-direction code, a right-direction code and an overlap YES/NO indication of each curve point (template points 1~4) arrayed in the counter-clockwise direction. Since the template points 1, 4 overlap another stroke in the interior thereof, "Inside Overlap" is entered in the overlap YES/NO column.

Figures 21A, 21B:
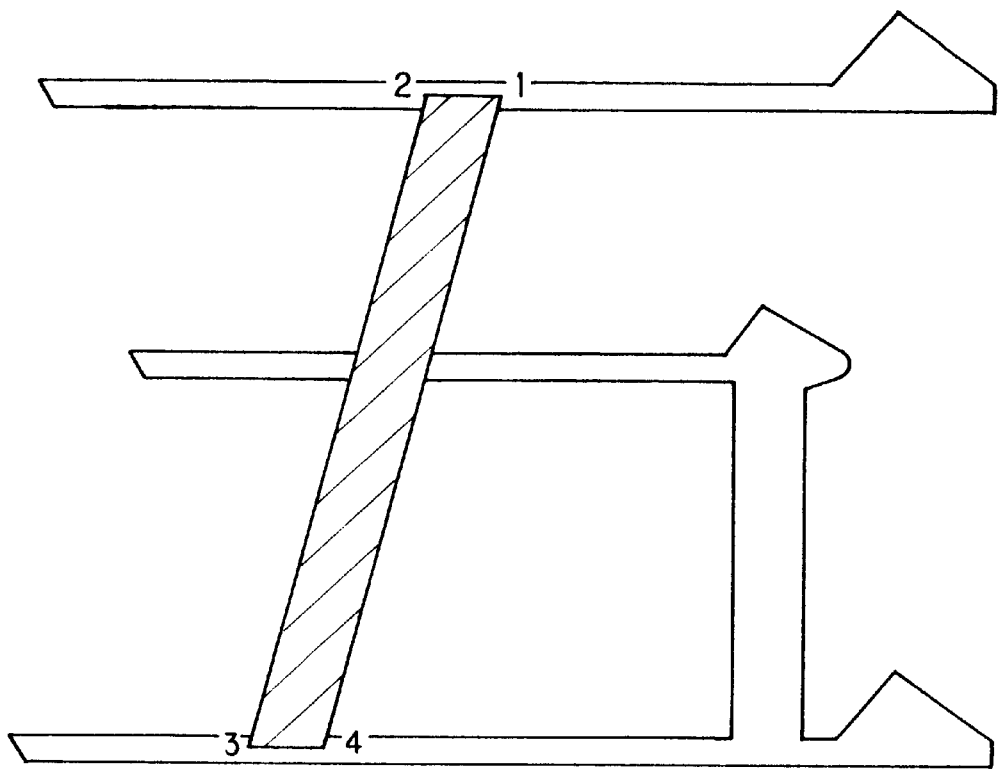
FIGS. 21A, 21B are diagrams (part 3) for describing stroke template information.

FIGS. 21A, 21B are diagrams for describing stroke template information in an archetype 9004 (stroke code 9=vertical slanting stroke, classification 4). The stroke template information includes a left-direction code, a right-direction code and an overlap YES/NO indication of each curve point (template points 1~4) arrayed in the counter-clockwise direction. Since the template points 1~4 overlap another stroke in the interior thereof, "Inside Overlap" is entered in the overlap YES/NO column.

Figures 22A, 22B:
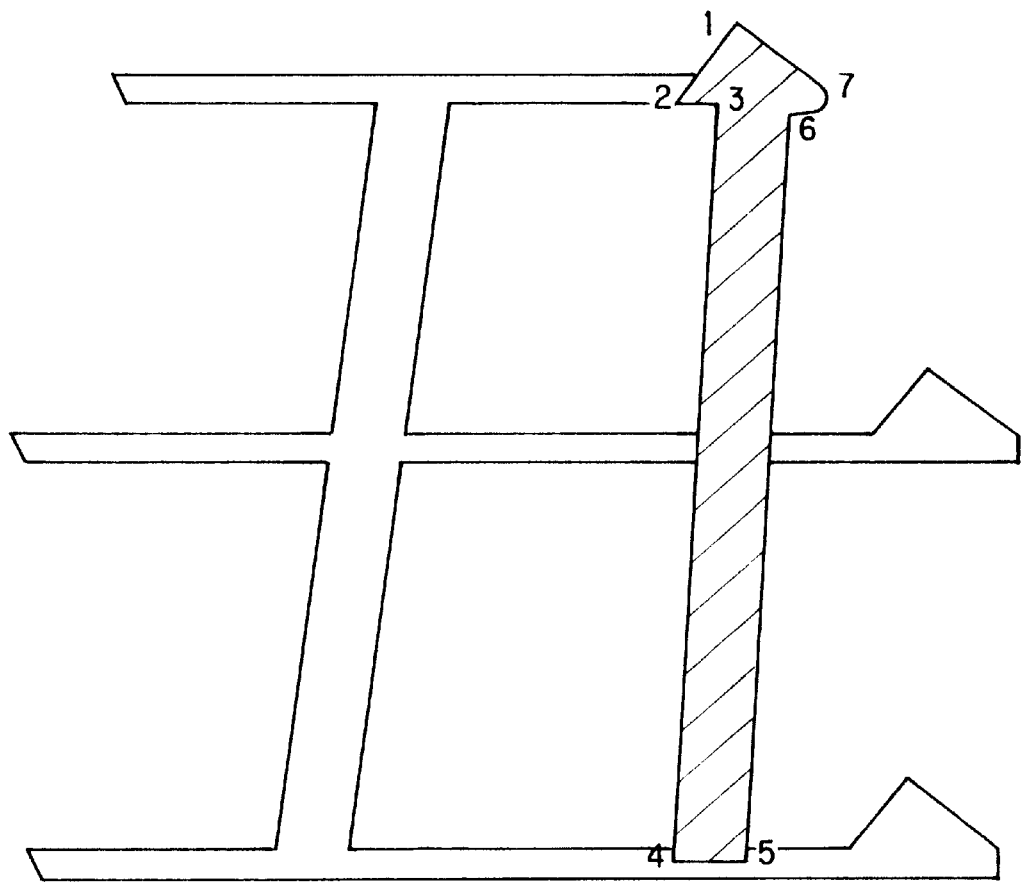
FIGS. 22A, 22B are diagrams (part 4) for describing stroke template information.
Figure 24:
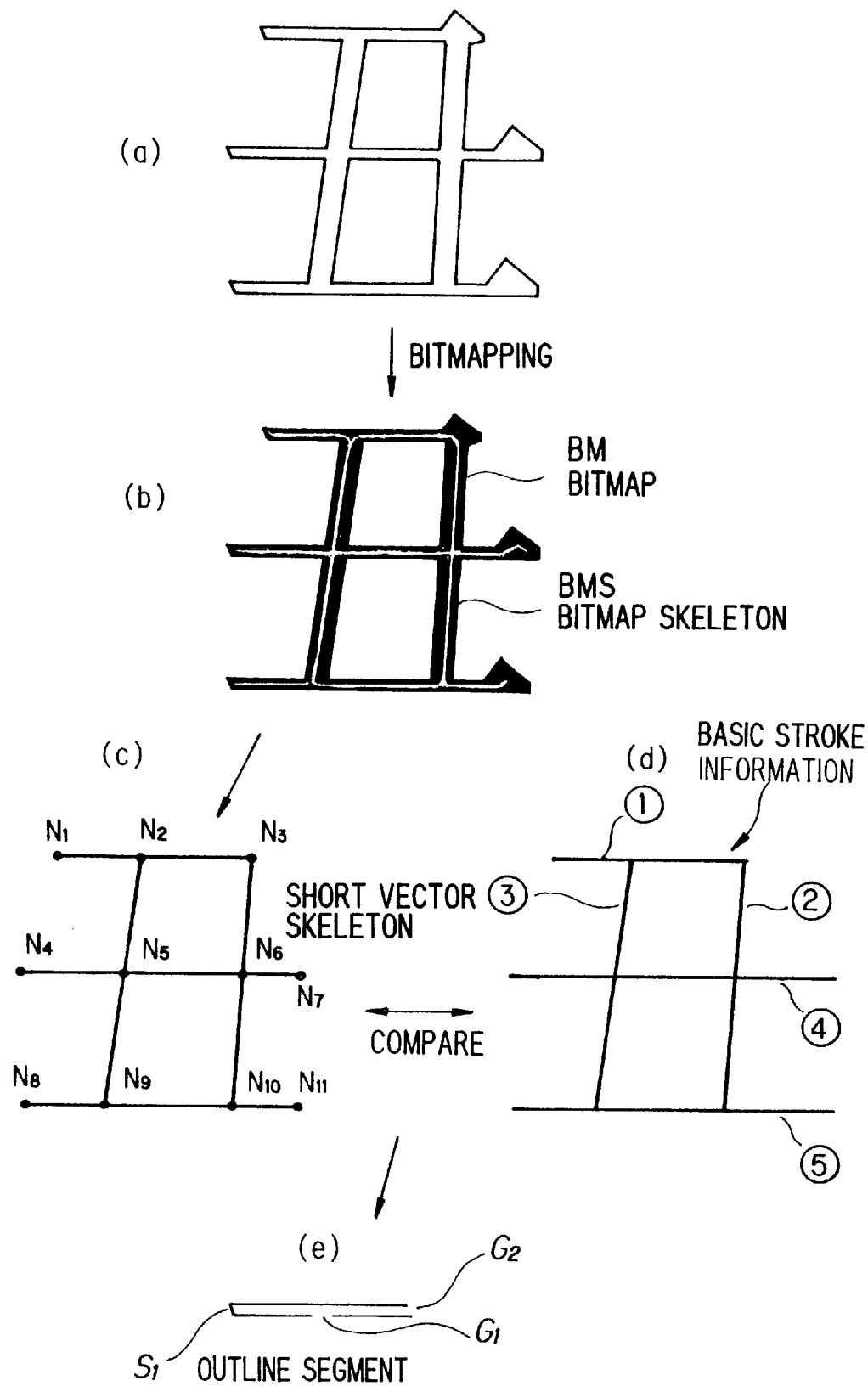
FIG. 24 is a diagram (part 1) for describing automatic cutting.

FIGS. 22A, 22B are diagrams for describing stroke template information in an archetype 9007 (stroke code 9=vertical slanting stroke, classification 7). The stroke template information includes a left-direction code, a right-direction code and an overlap YES/NO indication of each curve point (template points 1~7) arrayed in the counter-clockwise direction. Since the template point 2 overlaps another stroke on the line thereof, "ON Line Overlap" is entered in the overlap YES/NO column. Since the template point 3 overlaps another stroke on its corner, "Corner Overlap" is entered in the overlap YES/NO column. Since the template points 4, 5 overlap another stroke in the interior thereof, "Inside Overlap" is entered in the overlap YES/NO column.

If learning of a registered archetype ends, it is determined whether all registered archetypes have been learned (step 103). If an archetype that has not been learned exists, the processing from step 101 onward is repeated.

When the learning of all archetypes is finished, the Batch key in the key window 31 is selected and the batch mode (automatic cutting) is started up (step 104). Thereafter, the system cuts each character into strokes automatically using the stroke templates that have been learned (step 105) and stores the archetypes and shape data (directions and whether or not there is overlap) of the cut strokes in the character data base 24 (FIG. 7) (step 106). If a stroke that cannot be cut from a character exists in this case, the system saves the character code of the character containing this stroke as well as the stroke number in automatic cutting processing. Automatic stroke cutting will be described later.

When automatic stroke cutting processing for one character ends, it is determined whether the automatic cutting of all characters is finished (step 107). If the decision rendered is "NO", then processing from step 105 onward is repeated for the next character.

If the automatic cutting of all characters is finished, it is determined whether a stroke portion that cannot be cut automatically exists (step 108). If the decision rendered is "NO", then stroke cutting processing is terminated.

If a suitable archetype could not be found and strokes that could not be cut are determined to exist in automatic stroke cutting processing, the user cuts several of these uncut, remaining strokes on the control screen and registers them as stroke templates (re-learning). To perform re-learning, the user selects the Edit Sel key in the key window 31 and establishes the re-learning mode. In response to selection of the Edit Sel key, the system causes a list of characters containing strokes that could not be cut to be displayed in the character list 37 (see FIG. 9). It should be noted that if a plurality of strokes that could not be cut exist within one character, identical characters of this number are displayed in the character list window 37. When a prescribed character is double-clicked, the system causes an outline of the character to be displayed in the character window 34, causes the basic stroke information of this character to be displayed in the BSF window 35 and causes the stroke portions corresponding to the uncut strokes to be displayed by red lines. In this case, strokes that have been cut and stored are displayed by white lines in the character window 34 and strokes that are required to be re-learned are displayed by black lines.

Next, an operation for cutting strokes displayed by black lines from a character is performed in a manner similar to that of the learning mode of step 101, and stroke shapes that have been cut are stored in the character data base 24 as stroke templates (steps 109, 110).

When the learning of one stroke is finished, it is determined whether the re-learning of the necessary number of strokes has been completed (step 111). If strokes that have not yet been re-learned exist, then the processing from step 109 onward is repeated.

When re-learning of the required number of strokes is finished, the Mini Batch key in the key window 31 is selected and the mini-batch mode is started up (step 112). As a result, the system executes the processing from step 105 onward using the re-learned stroke templates and automatically cuts each uncut, remaining stroke from the character.

Thereafter, the above-described re-learning and mini-batch processing are repeated until there are no longer any uncut, remaining strokes.

(b) Processing for Automatic Cutting of Strokes from Characters

FIG. 23 is a detailed processing flowchart of the automatic cutting processing of steps 105~107. FIG. 24 and FIGS. 25A~29C are diagrams for describing automatic cutting.

First, a target Kanji character 典 to undergo automatic cutting is bitmapped [step 151; see FIGS. 24(a), (b)]. Next, a bitmap skeleton BMS, which is the center line in the bitmap BM, is obtained (step 152) and the bitmap skeleton BMS is converted to a short vector skeleton (step 153). The short vector skeleton is a collection of connection portions (short vectors) which connect nodes $N_1$~$N_{11}$ [see FIG. 24(c)] of the bitmap skeleton.

Thereafter, the skeleton [see FIG. 24(d)] of the target character 典 which is given by the basis stroke information and the short vector skeleton are superimposed and a search is performed for a short vector or a group of short vectors matching each of the basic strokes ①~⑤ of the skeleton based upon the basic stroke information (step 154). If a short vector or group of short vectors which matches is obtained, the strokes ①~⑤ of the basic stroke information and the outline segments (outline portions) of the character 典 are associated (step 155).

FIGS. 24(e), 26A, 27A, 28A and 29A show outline segments (outline portions) S1~S5 corresponding to first through fifth strokes ①~⑤ of the character 典.

Next, a search is performed for stroke templates that match the outline segments S1~S5 of the character 典 (step 156). In this case, the stroke codes of the outline segments S1~S5 are obtained from the basic stroke file BSF and therefore stroke templates that match the outline segments S1~S5 are searched from among the stroke templates that have these stroke codes. For example, the first outline segment S1 is stroke code 4 (horizontal stroke). Accordingly, a stroke template which resembles the outline segment S1 is searched from among the stroke templates having the horizontal stroke code 4.

It is determined whether stroke templates that match the outline segments S1~S5 have been retrieved (step 157). If the answer is "YES", an attempt is made to cut and generate strokes (ST1~ST5 in FIGS. 25A, 26B, 27B, 28B and 29B) having the same shapes as the stroke templates that match the outline segments S1~S5 from the target character (step 158). Next, it is determined whether strokes could be generated (step 159). If the answer is "YES", then the shape data of the generated strokes are stored in the character data base 24 (step 160).

Figures 25A, 25B:
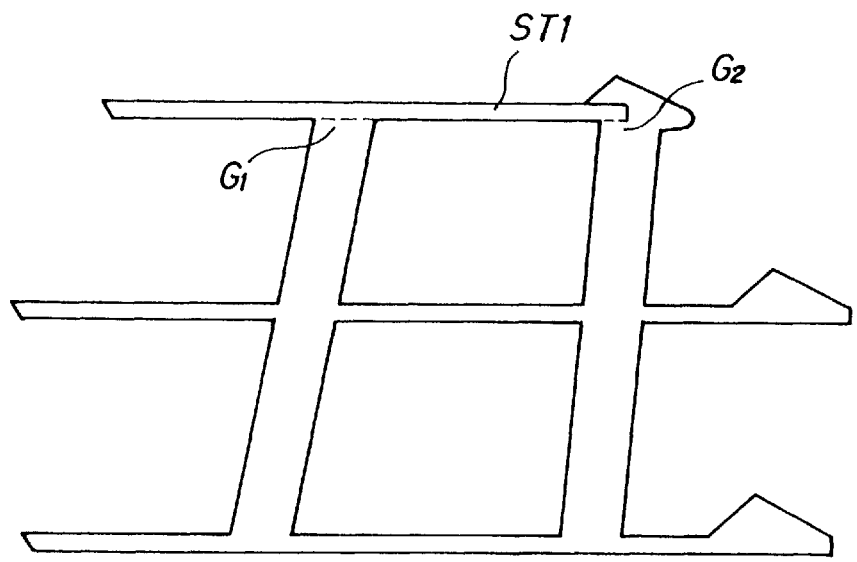
FIGS. 25A, 25B are diagrams (part 2) for describing automatic cutting.

The stroke template that matches the first outline segment S1 of the character 且 is archetype 4002 (see FIG. 20A). Accordingly, the stroke (the first stroke ST1 shown in FIG. 25A) is cut from the target character in such a manner that the shape will become identical with that of the stroke template of archetype 4002. More specifically, as shown in FIG. 25B, if cutting is performed using the cut operator Smooth at a first gap G1 of the first outline segment S1 and cutting is performed using the cut operator U at a second gap G2, the first stroke ST1 whose shape is identical with that of the stroke template of archetype 4002 can be obtained. Accordingly, shape data representing the stroke cut from the target character by applying the above-described cutting method are stored in the character data base.

Further, the stroke template that matches the second outline segment S2 (FIG. 26A) of the character 且 is archetype 9007 (see FIG. 22A). Accordingly, the stroke (the second stroke ST2 shown in FIG. 26B) is cut from the target character in such a manner that the shape will become identical with that of the stroke template of archetype 9007. More specifically, as shown in FIG. 26C, if cutting is performed using the cut operator Ext For at a first gap G1 of the second outline segment S2, cutting is performed using the cut operator Smooth at second and fourth gaps G2, G4 and cutting is performed using the cut operator U at a third gap G3, the second stroke ST2 whose shape is identical with that of the stroke template of archetype 9007 can be obtained. Accordingly, shape data representing the second stroke ST2 cut from the target character by applying the above-described cutting method are stored in the character data base.

Similarly, matching stroke templates are obtained with regard to outline segments S3, S4 and S5 shown in FIGS. 27A~29A, strokes are cut in such a manner that their shapes will become identical with those of these stroke templates and shape data representing the obtained strokes ST3, ST4 and ST5 are stored in the character data base.

If a stroke template cannot be retrieved at step 157 in FIG. 23, or if a stroke whose shape is identical with a stroke template that could be retrieved cannot be cut from the target character at step 159, the character code of the target character and the stroke number of the stroke are saved in the character data base (step 161).

If the processing of step 160 or 161 is finished, it is determined whether the automatic cutting of all characters is finished (step 162). If cutting is not finished, the program returns to the beginning and automatic cutting processing is executed for the next character.

FIG. 30 is a diagram for describing the correspondence between the stroke structure data and character codes that have been stored in the character data base 24. The basic stroke information BSF has disposition data and stroke codes arranged in correspondence with the stroke numbers of a character. A stroke pointer section STP has pointers P1~Pn, which point to stroke-structure storage locations, arranged to correspond to the stroke numbers of a character. The stroke numbers of the basic stroke information BSF and the stroke numbers of the stroke pointer section STP coincide. A stroke file section STF stores the structure (shape data, etc.) of each stroke generated by stroke cutting processing.

If a character code has been given, the basic stroke information (disposition data) of the character corresponding to the code and the structure of each stroke are obtained. Accordingly, each stroke is disposed in accordance with the disposition data, thereby the character can be outputted. In actuality, according to the present invention, strokes are further cut into parts, as will be described later.

(c) Part Cutting Processing

Figure 31:
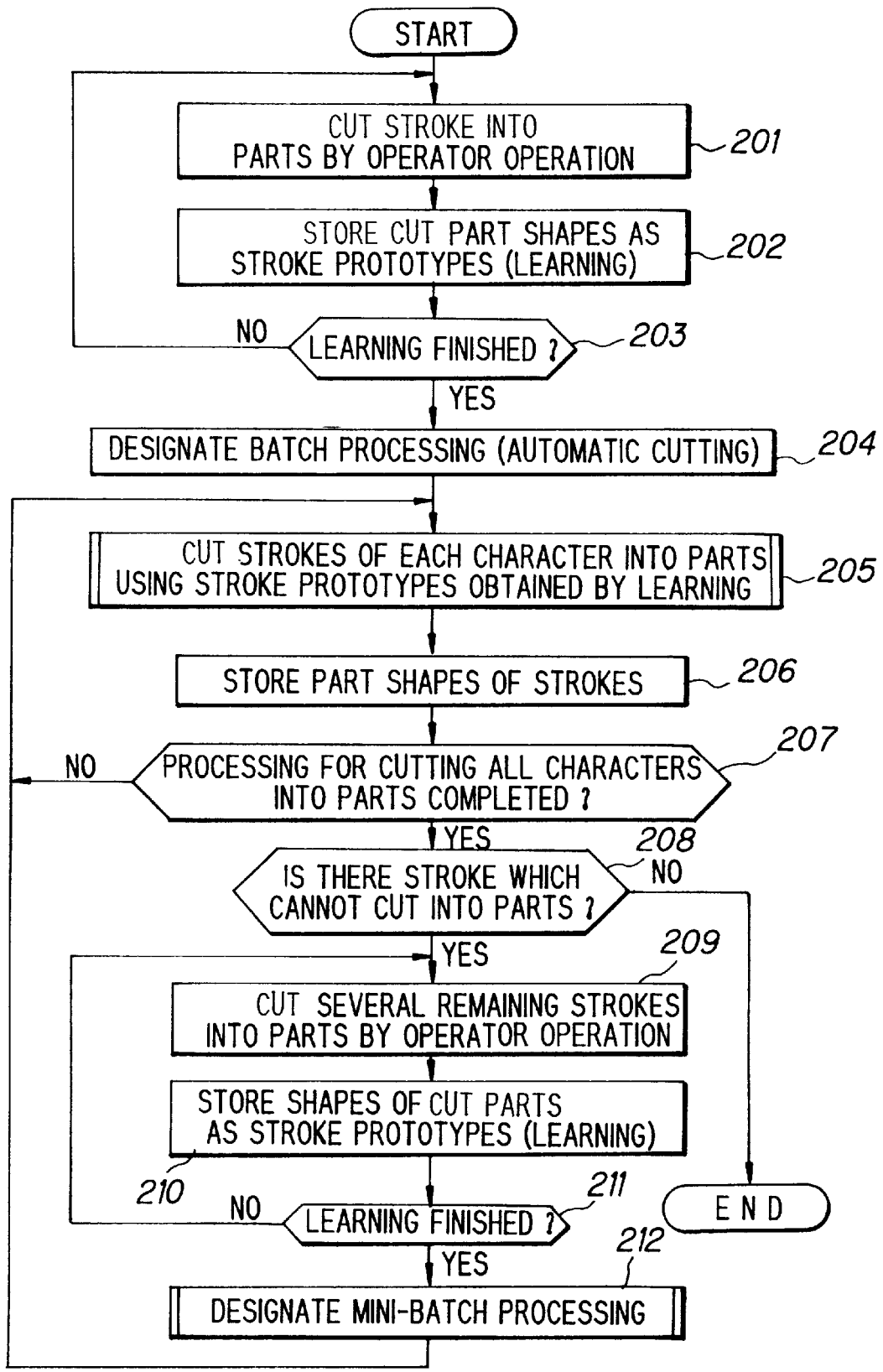
FIG. 31 shows the flow of stroke-to-part cutting processing.

FIG. 31 shows the flow of processing for cutting strokes into parts. In the learning mode, a stroke obtained in the stroke-cut learning mode is cut into parts.

First, the part cutting mode (stroke-to-part mode) is opened and the Learn key is selected to establish the learning mode. As a result, the system opens the archetype display window 39 (see FIG. 10) to display the list of 63 archetypes that have been registered in the system. It should be noted that all of the archetypes cannot be displayed on one screen. However, all of the archetypes can be viewed by scrolling.

Under these conditions, the user selects a prescribed archetype displayed in the archetype display window 39 and double clicks on the archetype using the mouse, whereupon the system opens the character window 34, causes the character selected in the character window to be displayed in a state in which it has been cut into strokes and displays the stroke (the shaded portion), which is to become the archetype, in the color red. Next, the user generates a part by cutting the stroke, which is being displayed by the red line, in the character window 34 using a cut operator. If cutting is executed in accordance with the cut operator, the system causes the cut line to be displayed in the color blue. This is step 201 in FIG. 31.

Thereafter, the user clicks on the Update key, whereupon the system displays a part-type setting screen. When the type (starting part, middle part, end part) of a part cut by the user is set, the results of learning are stored in the character data base as the stroke prototype (step 202).

Figures 33A, 33B:
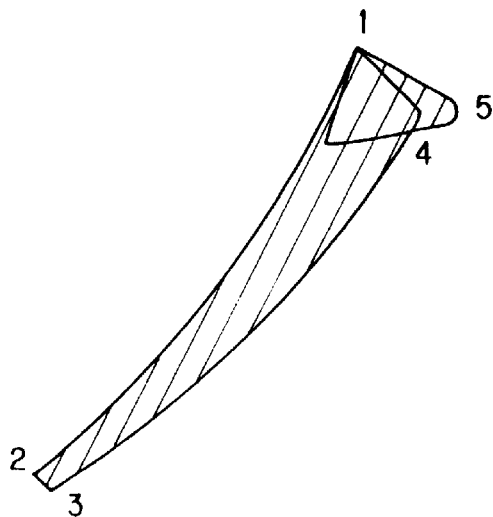
FIGS. 33A, 33B are diagrams (part 2) for describing stroke prototypes.

FIGS. 32A~34B are diagrams for describing stroke prototypes, in which FIGS. 32A, 33A and 34A show the shapes of stroke prototypes and FIGS. 32B, 33B and 34B illustrate stroke prototype information.

Stroke prototype information is expressed by (1) a stroke prototype code (stroke code, variation), (2) topological data, (3) a cutting function and (4) part-type code information specifying a starting part, middle part and end part. The topological data includes left-direction data, which indicate the direction of the outline at each curve point (template point) when the outline of the stroke has been traced in the counter-clockwise direction, as well as data indicating whether there is overlapping.

The cutting function specifies the cutting position and the cutting method. For example, in case of the stroke prototype of archetype 4001 in FIG. 32A, on the basis of the cutting function information, (1) cutting is performed using the cut operator Vertical at a point 0.1 W (where W represents the full length) from the template point 3 of the left end and (2) cutting is performed using the cut operator Ext For at the template point 2. Further, in case of the stroke prototype of archetype 22001 in FIG. 33A, on the basis of the cutting function information, (1) cutting is performed using the cut operator Ins Vtx at template points 1 and 4. Further, in case of the stroke prototype of archetype 24001 in FIG. 34A, on the basis of the cutting function information, (1) cutting is performed using the cut operator Ext Back/U at template point 5, and (2) cutting is performed using the cut operator Horiz at a point 0.8 W (where W represents the full length) from the template point 1 of the upper end.

If the learning of one archetype is finished, it is determined whether all archetypes have been learned (step 203).

If an archetype that has not been learned exists, then the processing from step 201 onward is repeated.

When the learning of all archetypes is finished, the Batch key in the key window 31 (FIG. 10) is selected and the batch mode (automatic cutting) is started up (step 204). Thereafter, the system cuts each stroke into parts automatically using the stroke prototypes that have been learned (step 205) and stores the shape data of the cut parts in the character data base 24 (step 206). If a stroke that cannot be cut into parts exist in this case, the system saves the character code of the character containing this stroke as well as the stroke number in automatic cutting processing.

When processing for automatically cutting all strokes belonging to one character into parts is finished, it is determined whether processing for automatically cutting all characters is finished (step 207). If this processing is not finished, then the processing from step 205 onward is repeated for the next character.

If the automatic cutting of all characters is finished, it is determined whether a stroke portion that cannot be cut automatically exists (step 208). If the decision rendered is "NO", then stroke-to-part cutting processing is terminated.

If a suitable archetype (stroke prototype) could not be found and strokes that could not be cut are determined to exist in part cutting processing, the user cuts several of these uncut, remaining strokes on the control screen and registers them as stroke prototypes (re-learning). To perform re-learning, the user selects the Edit Sel key in the key window 31 and establishes the re-learning mode. In response to selection of the Edit Sel key, the system causes a list of characters containing strokes that could not be cut to be displayed in the character list display window (a section the same as the archetype display window 39 of FIG. 10). It should be noted that if a plurality of parts that could not be cut from strokes exist within one character, identical characters of this number are displayed in the character list window. When a prescribed character is double-clicked, the system opens the character window 34, causes the character to be displayed in the form in which it has been separated into strokes and causes a stroke that could not be cut into parts to be displayed in the color red. Next, the user cuts the stroke, which is being indicated by the red line, in the character window 34 using a cut operator. When cutting by the cut operator is executed, the system causes the cut line to be displayed in the color blue (step 209).

When the Update key is subsequently clicked, the system displays the part-type setting window. When the user sets the part type (starting part, middle part or end part), the results of learning are stored in the character data base as a stroke prototype (step 210).

When the re-learning of one stroke is finished, it is determined whether the re-learning of the necessary number of part cuts has been completed (step 211). If parts that have not yet been re-learned exist, then the processing from step 209 onward is repeated.

When re-learning of the required number of part cuts is finished, the Mini Batch key in the key window is selected and the mini-batch mode is started up (step 212). As a result, the system executes the processing from step 205 onward using the re-learned stroke prototypes and automatically cuts each uncut, remaining stroke into parts.

Thereafter, the above-described re-learning and mini-batch processing are repeated until there are no longer any uncut, remaining strokes.

(d) Processing for Automatic Cutting of Parts from Strokes

Figure 35:
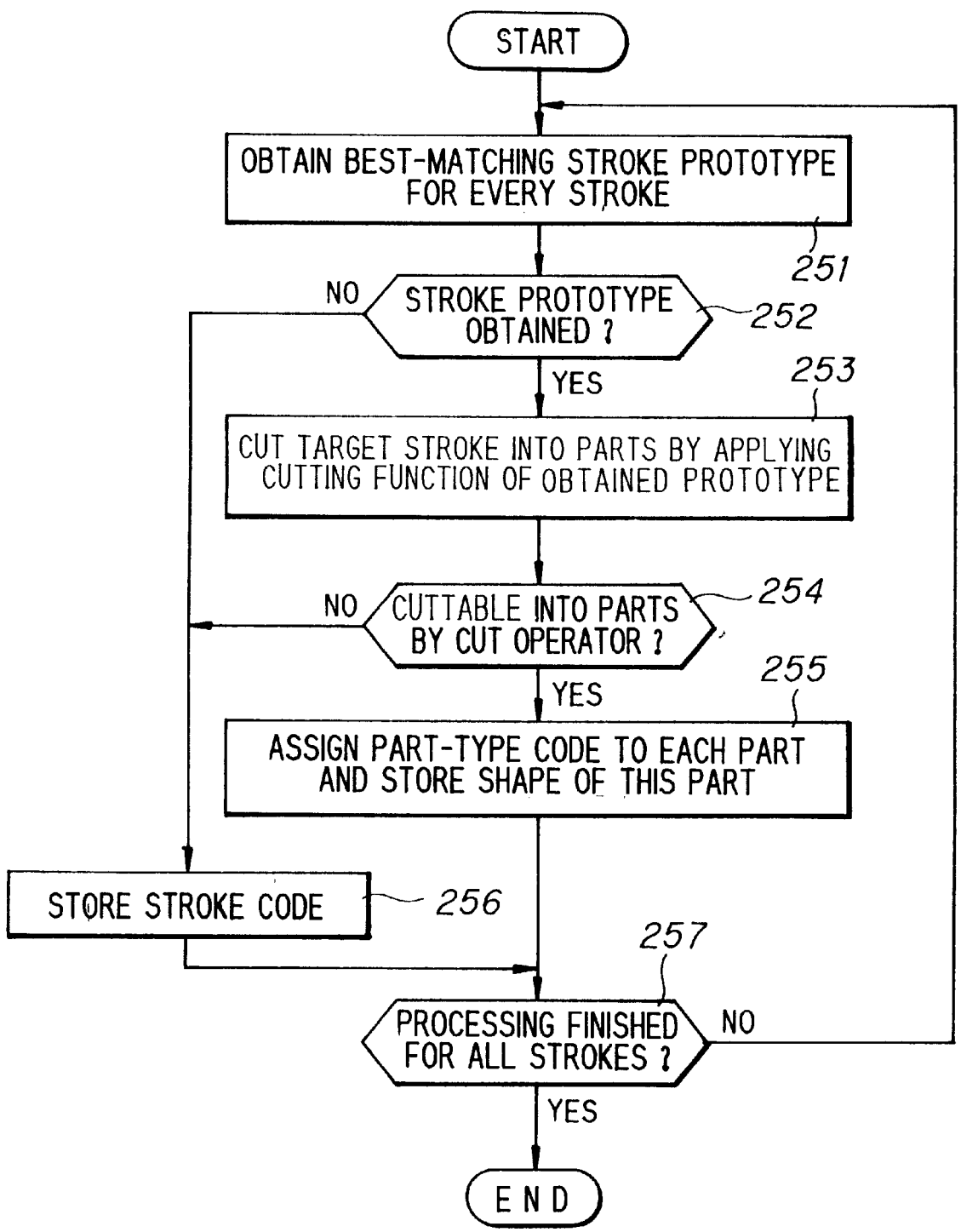
FIG. 35 shows processing for automatically cutting parts from strokes.

FIG. 35 is a detailed processing flowchart of the automatic part cutting processing of steps 205~207.

First, a search is performed for a stroke prototype that best matches a target stroke to be cut into parts automatically (step 251). In this case, the stroke prototype is deemed to match the target stroke when (1) the stroke prototype has a stroke code identical with that of the target stroke which is obtained from the basis stroke information BSF and (2) the direction codes of all template points of both the stroke prototype and the target stroke coincide. If several stroke prototypes matching the target stroke exist, the best matching stroke prototype is obtained.

Next, it is determined whether a matching stroke prototype has been obtained (step 252). If a matching stroke prototype has been obtained, an attempt is made to cut the target stroke into parts using the cutting function information of this stroke prototype (step 253). Thereafter, it is determined whether the target stroke could be cut in accordance with the cutting function information (step 254). If the answer is "YES", then a part type code is assigned to each part and the part shape data are stored in the character data base (step 255).

If a matching stroke prototype could not be obtained at step 252, or if cutting could not be performed in accordance with the cutting function information, then the character code of the character containing the target stroke and the stroke number are stored (step 256).

When the processing of step 255 or step 256 is finished, it is determined whether the automatic cutting of all strokes into parts is finished (step 257). If the decision rendered is "NO", then the program returns to the beginning and automatic cutting processing is executed with regard to the next stroke.

Figure 36:
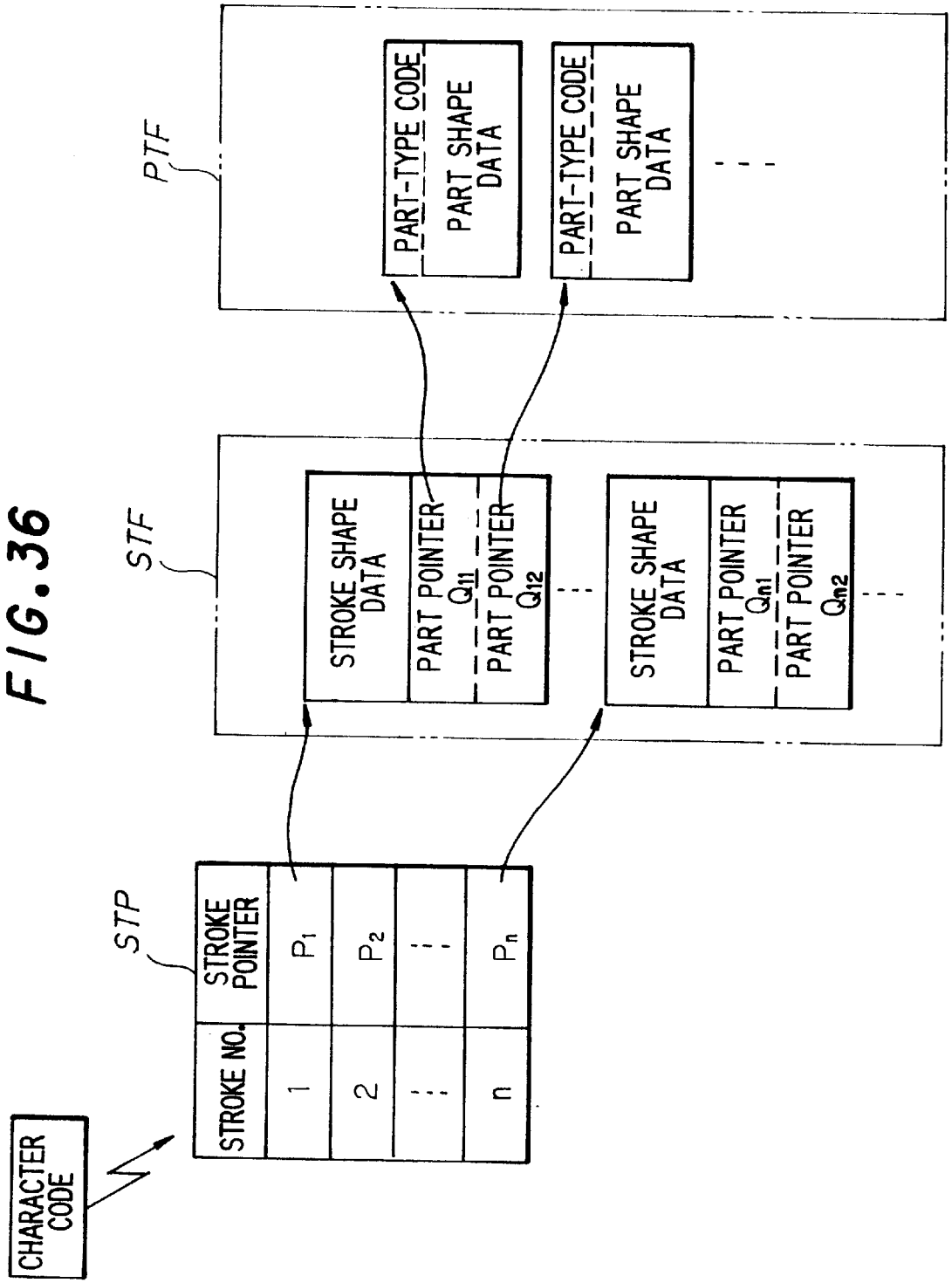
FIG. 36 is a diagram for automatically describing the relationship among a character code, a stroke file and a parts file.
Figure 37:
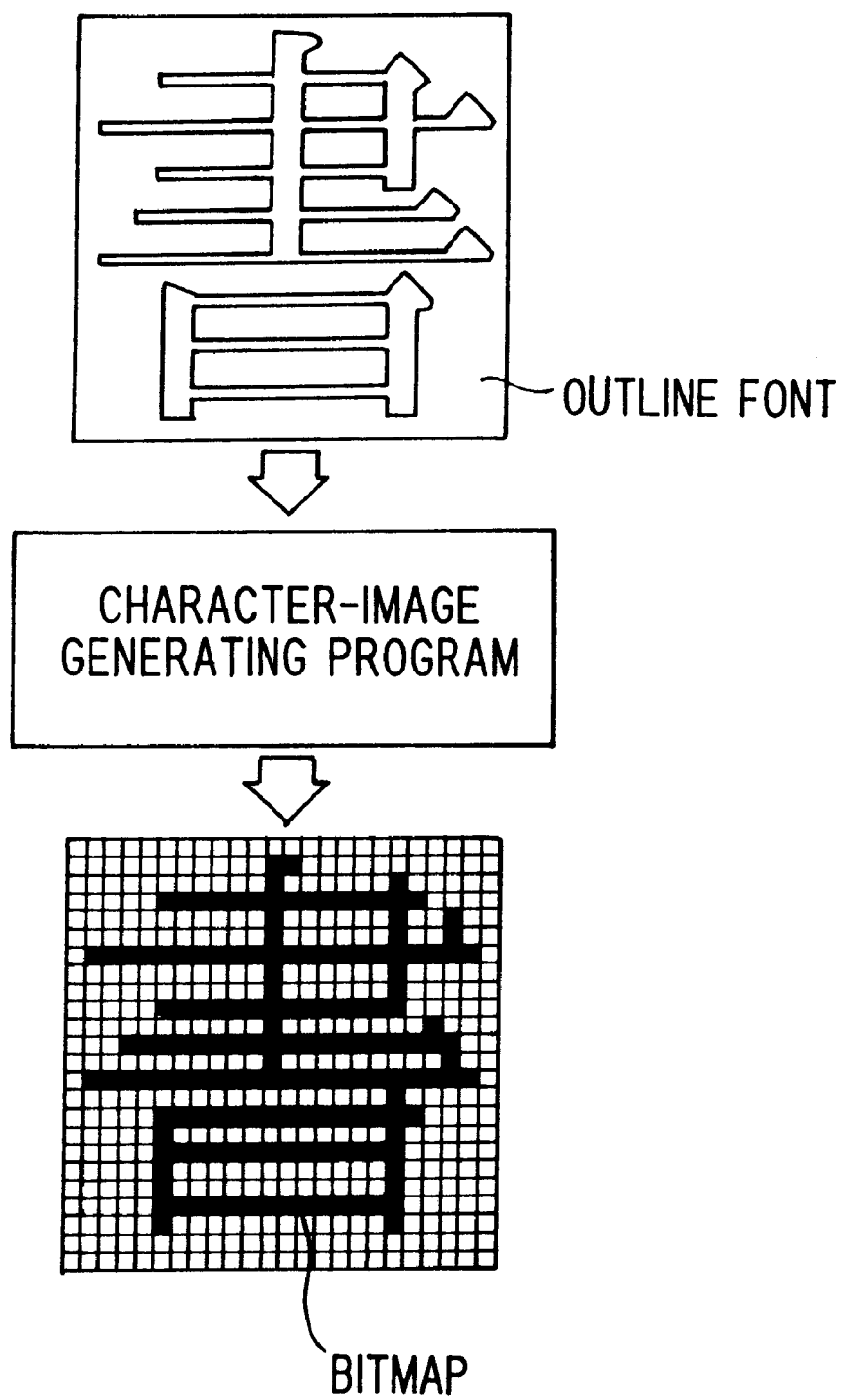
FIG. 37 is a diagram for describing an outline font.
Figure 39:
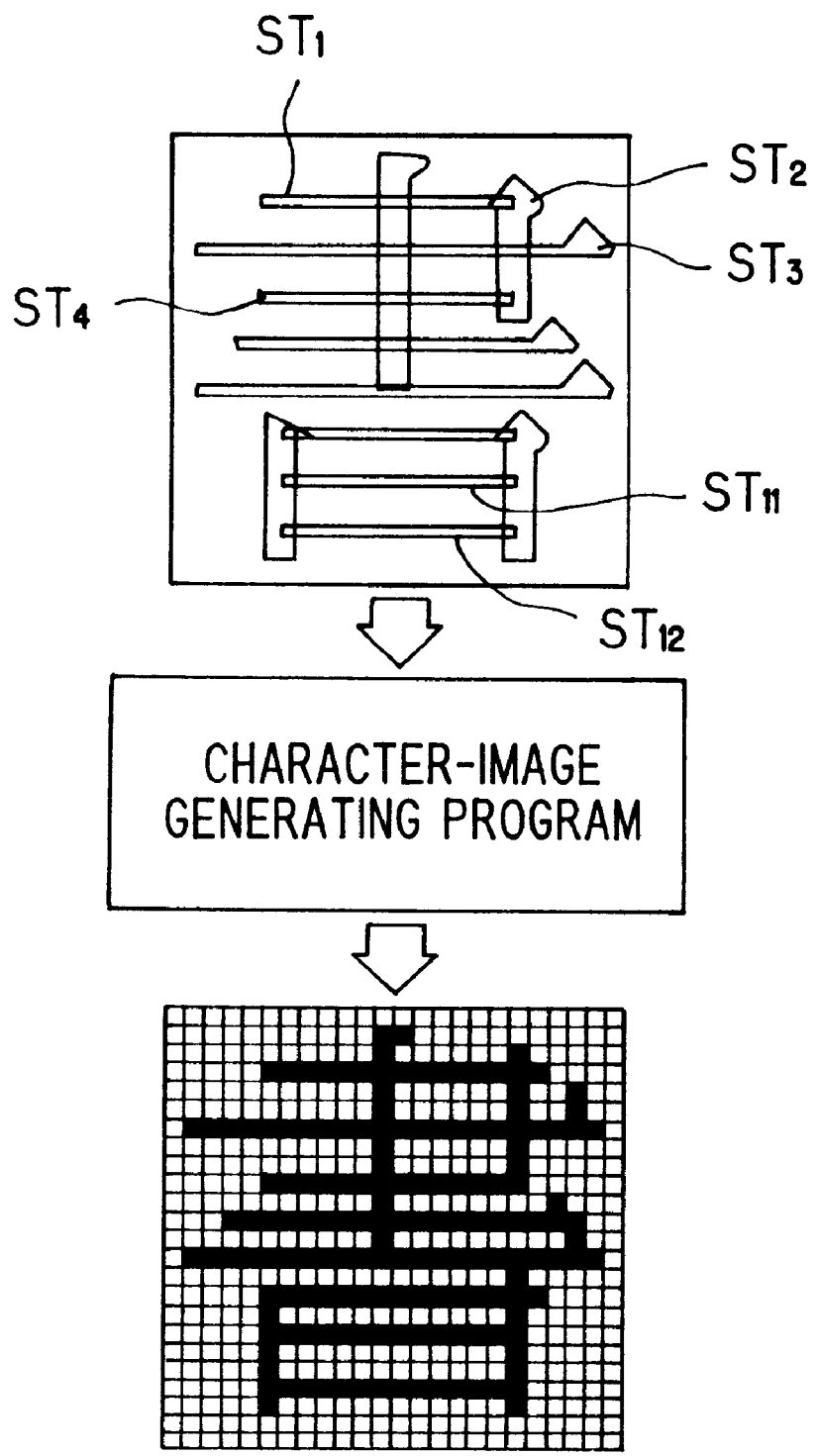
FIG. 39 is a diagram for describing an outline font to which the present invention is applied.
Figure 40:
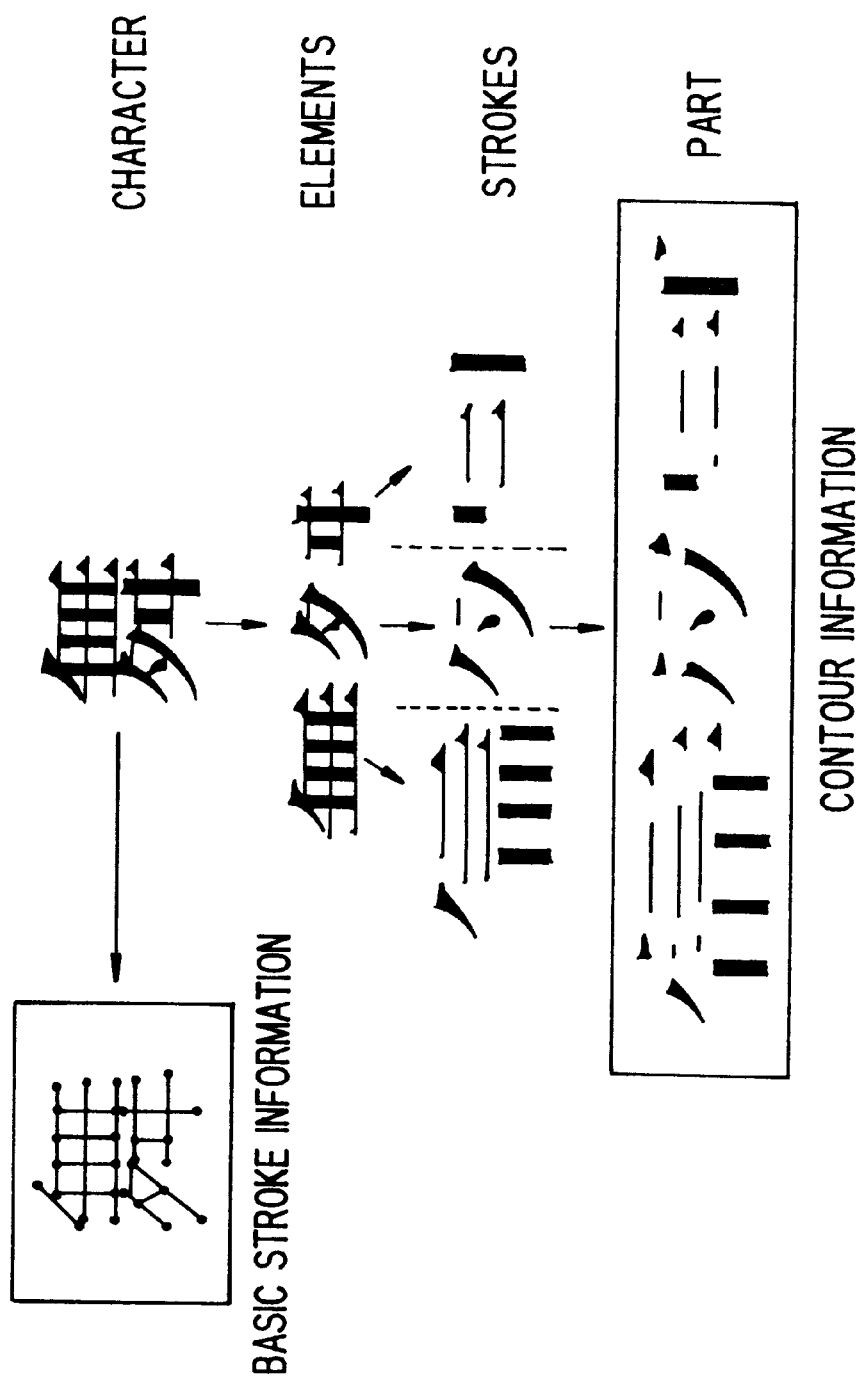
FIG. 40 is a diagram for describing a character, strokes and parts.
Figure 41:
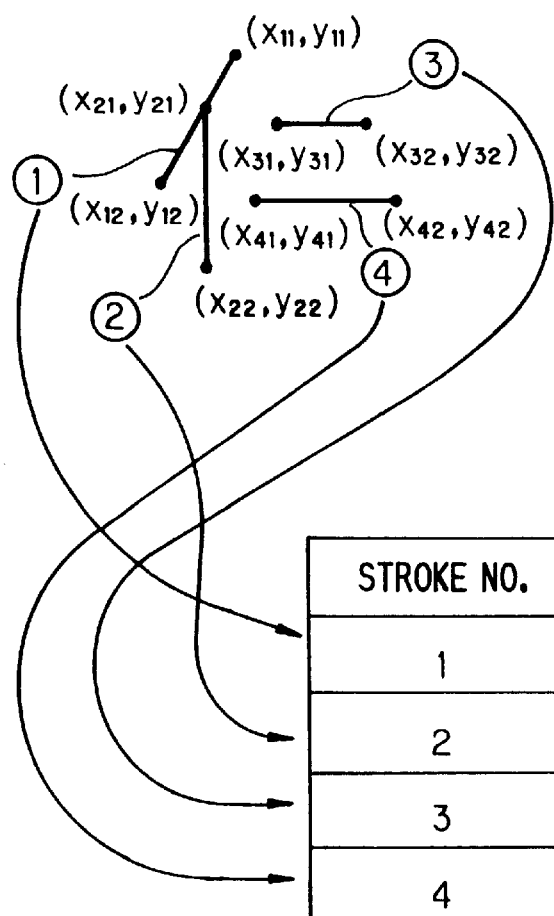
FIG. 41 is a diagram for describing basic stroke information.
Figure 42A:
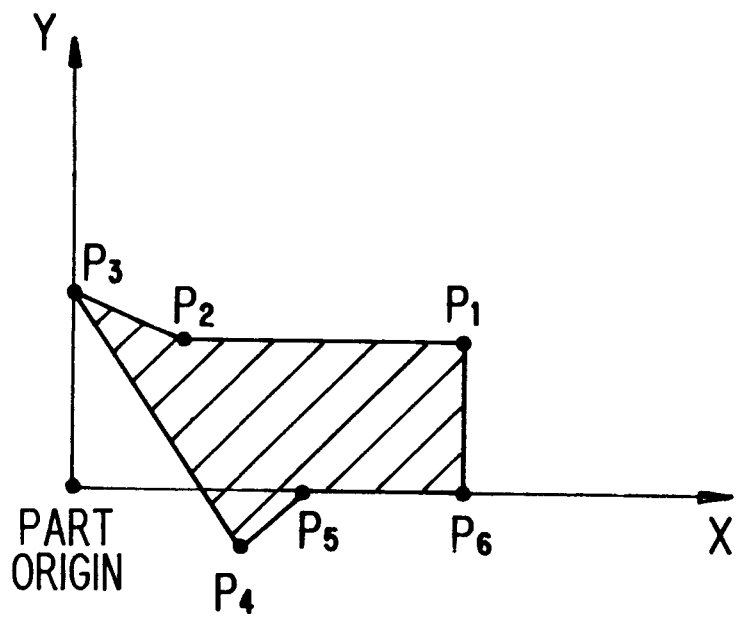
FIGS. 42A, 42B are diagrams for describing part coordinates.
Figure 42B:
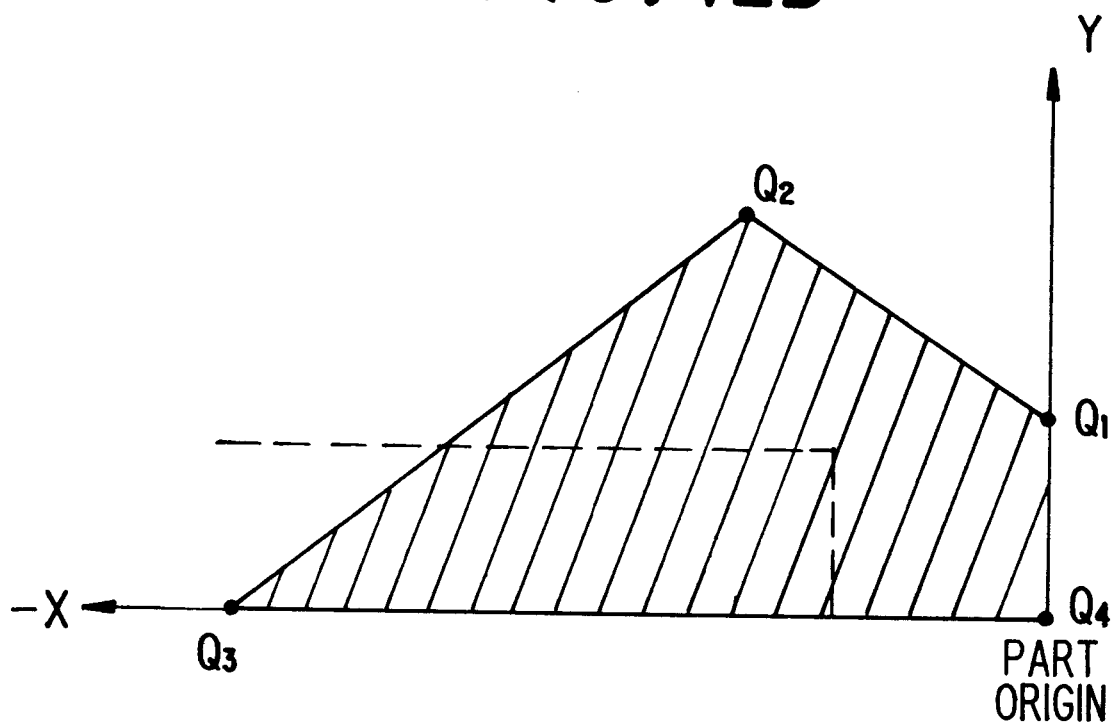
Figure 43:
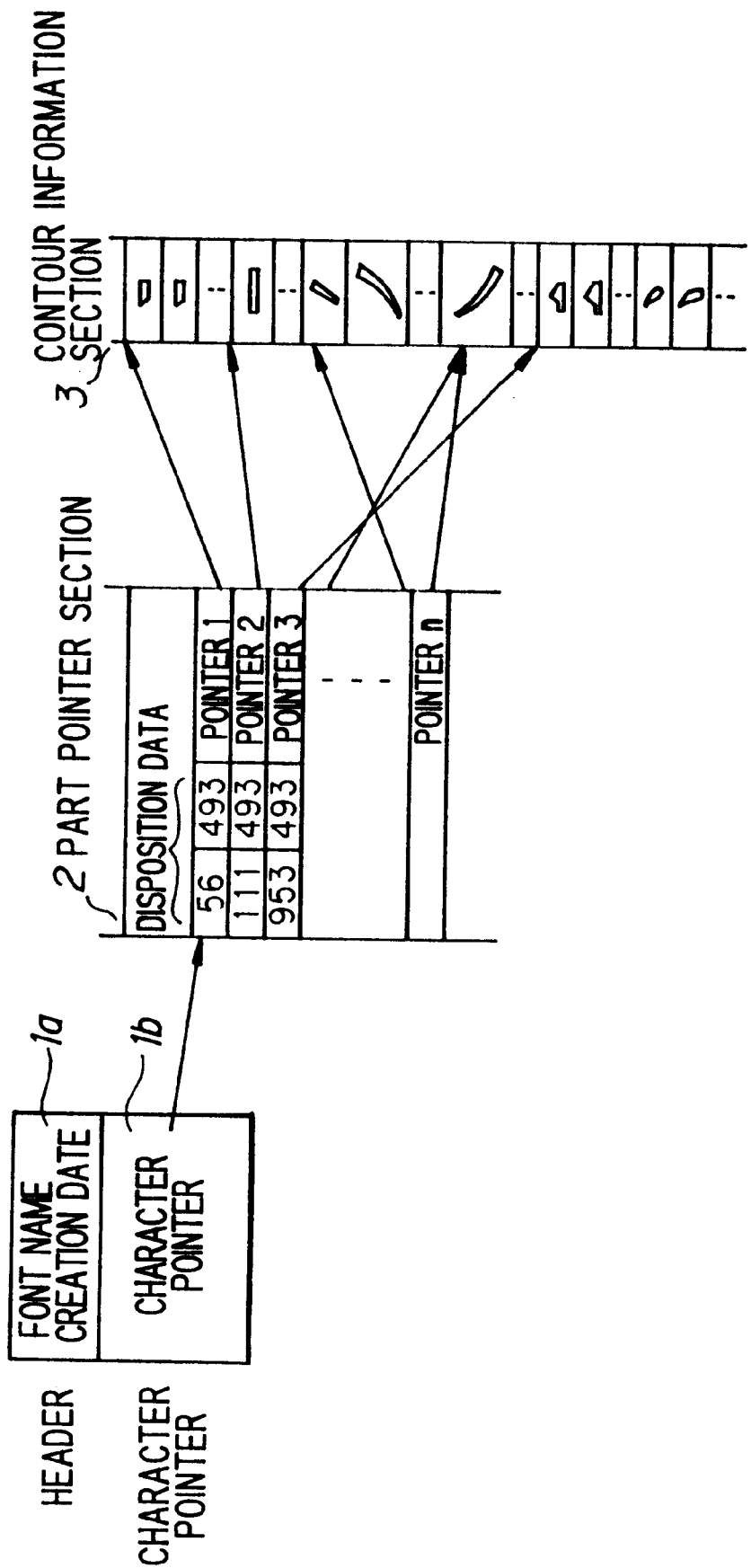
FIG. 43 is a diagram for describing the structure of a font file.
Figure 44A:
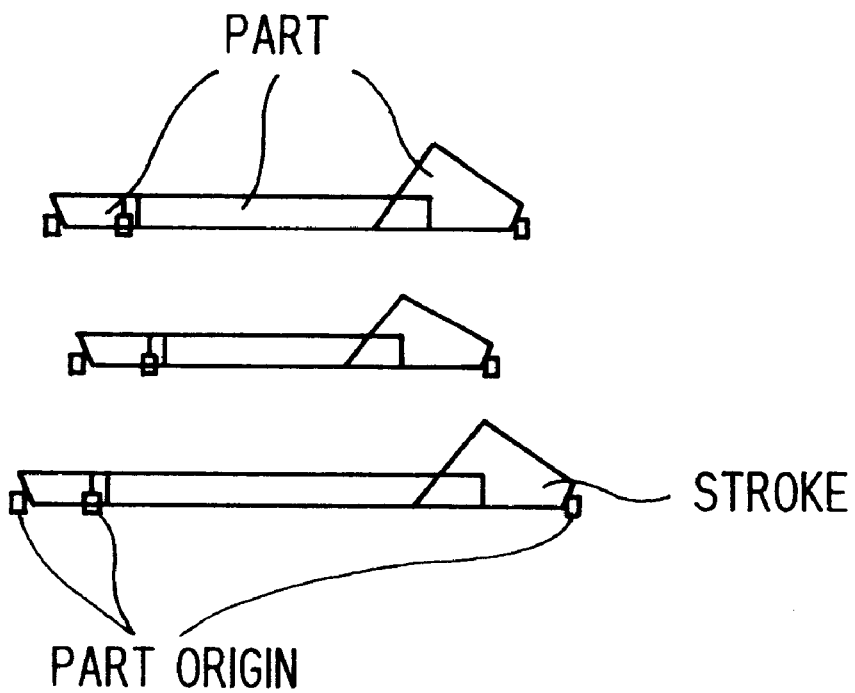
FIGS. 44A, 44B are diagrams for describing part origins.
Figure 44B:
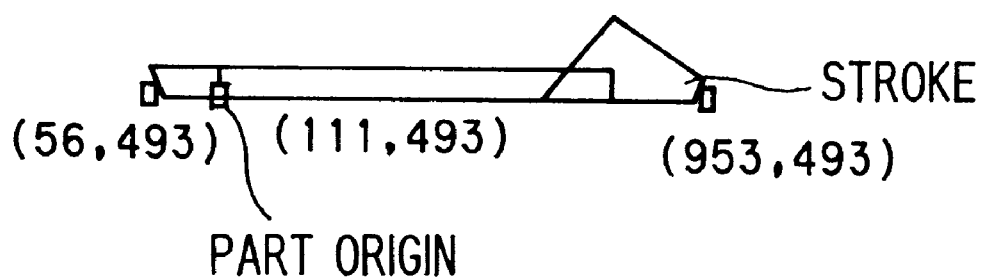

FIG. 36 is a diagram for describing the correspondence between a character code and a part file and stroke file stored in the character data base 24. A stroke pointer section STP has pointers P1~Pn, which point to stroke-structure storage locations, arranged to correspond to the stroke numbers of a character. (These stroke numbers coincide with the stroke number in the basic stroke information BSF.) A stroke file section STF stores (1) shape data representing strokes obtained by character-to-stroke cutting processing, and (2) part pointers $Q_{11}, Q_{12}, \ldots, Q_{n1}, Q_{n2}$, which point to storage locations for the shape data of parts that can be obtained when the strokes are cut into parts. A part file PTF stores shape data representing parts obtained by stroke-to-part cutting processing. A program for producing a font file creates and outputs a font file of part-element fonts using the above-mentioned data and basic stroke information BSF.

In accordance with the part-elements fonts of the present invention, characters can be prevented from deteriorating and characters having good balance overall can be outputted, as shown in FIG. 38C.

Though the present invention has been described specifically with regard to kanji, it goes without saying that kanji are not the only characters to which the invention can be applied. The invention can of course be applied to characters such as the Hankul alphabet.

(D) EFFECTS (a) Effects of Cutting Characters into Strokes

In accordance with the present invention, the shapes of strokes cut from characters by operator operation are learned as stroke template shapes and each character is cut into strokes automatically based upon the shapes of the stroke templates learned. As a result, characters can be cut into strokes efficiently.

Further, in accordance with the present invention, if characters incapable of being cut into strokes automatically exist, the shapes of strokes cut from some of these characters by operator operation are re-learned as stroke template shapes and strokes are cut from uncut, remaining characters automatically based upon the shapes of the stroke templates re-learned. By repeating learning and automatic cutting based upon the knowledge learned, strokes can be cut from all characters efficiently.

Further, in accordance with the present invention, cut operators specifying a plurality of fundamental cutting methods for cutting strokes from characters are displayed on a control screen, a target character is displayed on the control screen, a prescribed cut operator and a cutting position are designated, a stroke is cut from a character by a cutting method conforming to the cut operator, and the shape and classification of the stroke that has been cut are stored in memory, whereby the shape of a stroke template is learned. As a result, the learning operation can be simplified. In addition, by using a cut operator, a stroke can be cut and used as a stroke template without sacrificing the design possessed by the original outline font.

Further, in accordance with the invention, a character is displayed on the control screen, direction data at each curve point of a stroke cut by operator operation are obtained on the control screen, and stroke template information in which the direction data are arrayed in regular order along a predetermined direction are stored in memory, whereby learning is performed. In automatic cutting of strokes from a character, the outline of a target character is broken down into outlines (outline segments) on a stroke-by-stroke basis, a stroke template which resembles an outline segment is obtained, strokes are cut from the target character in such a manner that the shapes thereof become identical with those of the stroke templates, and the shapes of the cut strokes are stored in memory. As a result, strokes can be cut from a character automatically without sacrificing the design possessed by the original outline font.

Further, in accordance with the present invention, basic stroke information consisting of data giving the disposition of strokes in a character and stroke classifications arrayed in accordance with the order in which the character is written is prepared for each character. In a step of breaking down a stroke into outline segments, the character is bitmapped, the bitmap skeleton thereof is obtained, the bitmap skeleton is converted to a short vector skeleton, which is a collection of short vectors connecting adjacent nodes of the bitmap skeleton, the short vector skeleton and the skeleton of the target character obtained from the basic stroke information are compared, a group of one or more short vectors corresponding to each stroke of the target character is obtained, and the outline of a target character is broken down into outline segments for every group of short vectors corresponding to a stroke. As a result, a character can be broken down reliably into outline segments of every stroke and strokes can be cut from characters automatically without sacrificing the design possessed by the original outline font.

Further, in accordance with the invention, the shape classification of an outline segment is obtained from basic stroke information, and a stroke template resembling the outline segment is obtained from the stroke template having the above-mentioned shape classification. As a result, stroke templates of interest can be searched and retrieved at high speed.

(b) Effects of Cutting Strokes into Parts

In accordance with the present invention, a stroke is cut into parts by operator operation and the cutting method, cutting positions and stroke shape that prevail at this time are learned by being stored as stroke prototype information. Each stroke is cut into parts automatically based upon the prototype information that has been learned. As a result, strokes can be cut into parts efficiently.

If strokes that could not be cut automatically exist, several of these strokes are cut into parts by operator operation and the cutting method, cutting positions and stroke shapes that prevail at this time are learned by being stored as stroke prototype information. On the basis of the re-learned prototype information, remaining, uncut strokes are cut into parts automatically. By repeating learning and automatic cutting based upon the knowledge learned, parts can be cut from all strokes efficiently.

Further, in accordance with the present invention, cut operators specifying a plurality of fundamental cutting methods for cutting parts from strokes are displayed on a control screen, a cutting position is designated by a predetermined cut operator, a part is cut from a stroke by a cutting method conforming to the cut operator, and the cutting method, cutting positions and stroke shapes that prevail at this time are learned by being stored as stroke prototype information. As a result, the learning operation can be simplified. In addition, by using a cut operator, a part can be cut from a stroke and used as a stroke prototype without sacrificing the design possessed by the original outline font.

Further, in accordance with the invention, a stroke prototype whose outline resembles a target stroke is obtained, the target stroke is cut in accordance with the cutting method and cutting-position data specified by the stroke prototype obtained, and the part shape obtained by cutting is stored in memory. As a result, parts can be cut from strokes automatically without sacrificing the design of the original outline font.

Further, in accordance with the invention, strokes are cut from characters and parts are cut from strokes efficiently. As a result, an outline font expressing a collection of parts can be produced much more rapidly and efficiently in comparison with the prior art. In accordance with the invention, an outline font is expressed as a collection of parts. Accordingly, it is possible to perform control in such a manner that deterioration of the character will not occur or in such a manner that unnecessary portions will not be emphasized. This makes it possible to output a character exhibiting excellent legibility while the design possessed by the original outline font is preserved.

As many apparently widely different embodiments of the present invention can be made without departing from the spirit and scope thereof, it is to be understood that the invention is not limited to the specific embodiments thereof except as defined in the appended claims.

What is claimed is:

1. A method of cutting an outline font into strokes in an outline-font creation apparatus for cutting an outline of a character into single strokes, cutting the strokes into parts and expressing the character by a collection of the parts, said method comprising:

a first step of learning the shapes of strokes, which have been cut from characters by operator operation, as the shapes of stroke templates; and a second step of cutting each character into strokes automatically based upon the learned shapes of the stroke templates.

2. The method according to claim 1, wherein if there are characters which cannot be cut into strokes automatically, said method further comprises:

a third step of re-learning the shapes of strokes, which have been cut from several of these characters by an operator operation, as the shapes of stroke templates; and a fourth step of cutting strokes automatically from as yet uncut, remaining characters based upon the re-learned shapes of the stroke templates.

3. The method according to claim 1, wherein said first step includes the steps of:

displaying cut operators, which specify a plurality of fundamental cutting methods for cutting strokes from characters, on a control screen and displaying a character of interest on the character control screen;

designating a predetermined cut operator and a cutting position, and cutting a stroke from a character by the cutting method conforming to this cut operator; and learning the shape of a stroke template by storing the shape of the cut stroke and a classification of the stroke.

4. The method according to claim 1, wherein said first step includes the steps of:

displaying a character on a control screen;

cutting strokes from the character by operator operation on the control screen and obtaining direction data at each curve point of the outline of each cut stroke, respectively;

storing, in memory, stroke template information consisting of the direction data arrayed in regular order along a predetermined direction and a shape classification data of the stroke; and said second step includes:

a first sub-step of breaking down an outline of a character of interest into outline segments on a stroke-by-stroke basis;

a second sub-step of obtaining a stroke template resembling each of the outline segments respectively;

a third sub-step of cutting strokes from the character of interest in such a manner that the shapes thereof become identical with those of the stroke templates; and a fourth step of storing the cut stroke shapes in memory.

5. The method according to claim 4, wherein said second step further includes a step of preparing, for each character, basic stroke information consisting of disposition data giving the disposition of strokes in the character and shape classification data of the strokes, said disposition data and said classification data being arrayed in accordance with the order in which the character is written; and said first sub-step includes steps of:

bitmapping the character of interest and obtaining a bitmap skeleton thereof;

converting the bitmap skeleton to a short vector skeleton, which is a collection of short vectors connecting adjacent nodes of the bitmap skeleton;

comparing the skeleton of the character of interest obtained from the basic stroke information and the short vector skeleton, and obtaining a set of short vectors corresponding to each of the strokes of the character of interest; and breaking down the outline of the character of interest into outline segments per each set of short vectors corresponding to a stroke.

6. The method according to claim 5, wherein said second sub-step includes the steps of:

obtaining shape classification of an outline segment from basic stroke information; and obtaining, from among stroke templates having said shape classification, a stroke template resembling an outline segment.

7. A method of cutting an outline font into parts in an outline-font creation apparatus for cutting an outline of a character into single strokes, cutting the strokes into parts and expressing the character by a collection of the parts, said method comprising:

a first step of learning, by storing as stroke prototype information, a cutting method, cutting positions and stroke shapes that prevail when strokes are cut into parts by operator operation; and a second step of cutting each stroke into parts automatically based upon the learned stroke prototype information.

8. The method according to claim 7, wherein if there are strokes that cannot be cut automatically, said method further comprises:

a third step of cutting several of these strokes into parts by operator operation and re-learning, by storing as stroke prototype information, a cutting method, cutting positions and stroke shapes that prevail when these several strokes are cut into parts; and a fourth step of automatically cutting uncut, remaining strokes based upon the re-learned stroke prototype information.

9. The method according to claim 8, wherein said first step further includes the steps of:

displaying cut operators, which are keys specifying a plurality of fundamental cutting methods for cutting parts from strokes, on a control screen and displaying a stroke of interest on the character control screen;

designating a predetermined cut operator and a cutting position, and cutting a part from a stroke by the cutting method conforming to this cut operator; and performing learning by storing, as prototype information, the cutting method, cutting position and stroke shape prevailing at this time.

10. The method according to claim 9, wherein the stroke shape is specified by direction data at each curve point of a stroke outline, and cutting position is specified by a ratio of total length of the stroke to a length from one end of the stroke to the cutting position.

11. The method according to claim 10, wherein said second step includes the steps of:

obtaining a stroke prototype whose outline resembles a stroke of interest;

cutting the stroke of interest, at a position indicated by said ratio, into parts by the cutting of method of the prototype obtained; and storing the part shapes cut.

12. A method of learning to cut a character into individual single strokes in order to automatically cut a similar character by an outline-font creation apparatus, comprising:

comparing an input character to a plurality of characters stored in a stroke template based on shape of the input character;

selecting one of the plurality of characters in the stroke template that closely matches the input character;

identifying strokes in the input character that match strokes in selected character from the stroke template;

cutting strokes in the input character based on the strokes identified in selected character from the stroke template;

displaying to an operator any remaining strokes of the input character which did not match strokes in the character from the stroke template and which were not cut;

monitoring the operator cutting the remaining strokes in the input character including associated cutting positions of the strokes when all the strokes of the input character have not been cut automatically by the outline-font creation apparatus;

storing the remaining strokes of the input character cut by the operator and associated cutting positions in the stroke template only when it was necessary for the operator to cut strokes not automatically cut by the outline-font creation apparatus.

* * * * *